US010930033B1

(12) United States Patent
Peterson

(10) Patent No.: US 10,930,033 B1
(45) Date of Patent: Feb. 23, 2021

(54) CONTENT AWARE TRACING FOR GENERATING VECTOR DRAWINGS

(71) Applicant: Adobe Inc., San Jose, CA (US)

(72) Inventor: John Peterson, Menlo Park, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/595,185

(22) Filed: Oct. 7, 2019

(51) Int. Cl.
*G06T 11/20* (2006.01)
*G06T 7/13* (2017.01)
*G06F 3/0484* (2013.01)

(52) U.S. Cl.
CPC ........ *G06T 11/203* (2013.01); *G06F 3/04842* (2013.01); *G06T 7/13* (2017.01); *G06T 2200/24* (2013.01)

(58) Field of Classification Search
None
See application file for complete search history.

*Primary Examiner* — Vu Nguyen
(74) *Attorney, Agent, or Firm* — Nicholson De Vos Webster & Elliott LLP

(57) ABSTRACT

Techniques and systems are provided for generating a vector drawing from a raster image. For example, an edge map for a raster image can be obtained, and a point of the edge map can be determined that corresponds to an input position associated with user interaction with a graphical user interface. A search process can be performed to determine an edge point of the edge map corresponding to the input position. Using the search process, the edge point is determined from a neighborhood of points associated with the point of the edge map. Using a plurality of edge points of the edge map (including the determined edge point), a vector drawing segment for a vector drawing representing the raster image can be generated.

20 Claims, 16 Drawing Sheets

700

---

OBTAIN AN EDGE MAP FOR A RASTER IMAGE, THE RASTER IMAGE INCLUDING A PLURALITY OF PIXELS, AND THE EDGE MAP INDICATING ONE OR MORE EDGES IN THE RASTER IMAGE
702

↓

DETERMINE A POINT OF THE EDGE MAP CORRESPONDING TO N INPUT POSITION, THE INPUT POSITION BEING BASED ON A USER INTERACTION WITH A GRAPHICAL USER INTERFACE DISPLAYING THE RASTER IMAGE
704

↓

DETERMINE AN EDGE POINT OF THE EDGE MAP CORRESPONDING TO THE INPUT POSITION, THE EDGE POINT BEING DETERMINED FROM A NEIGHBORHOOD OF ONE OR MORE POINTS ASSOCIATED WITH THE POINT OF THE EDGE MAP
706

↓

GENERATE, USING A PLURALITY OF EDGE POINTS OF THE EDGE MAP, A VECTOR DRAWING SEGMENT FOR A VECTOR DRAWING REPRESENTING THE RASTER IMAGE, THE PLURALITY OF EDGE POINTS INCLUDING THE DETERMINED EDGE POINT AND BEING BASED ON THE USER INTERACTION WITH THE GRAPHICAL USER INTERFACE
708

FIG. 7

CONTENT AWARE TRACING FOR GENERATING VECTOR DRAWINGS

FIELD

This application is generally related to converting images from one format to another. For example, aspects of this application relate to content aware tracing for generating vector drawings from raster images.

BACKGROUND

A variety of hardware and software platforms are available for creating digital graphics. One type of digital graphic that can be created and/or edited by a computing system and related software is a vector drawing. A vector drawing (also referred to as a vector graphic or vector image) is a graphic including points, lines, and/or curves related to one another using mathematical formulas. In some cases, a vector drawing can include vector curves (e.g., Bézier curves), which include parametric (e.g., cubic polynomial) curves defined using one or more points. Raster images are also used to create digital graphics. A raster image is made up a plurality of pixels that define the color components of the raster image (e.g., a red (R)-green (G)-blue (B) image includes pixels having R, G, and B components). Unlike raster images, vector drawings are scalable to any size without creating blurring or artifacts and, in many cases, are stored more compactly than raster images. However, despite the advantages of vector drawings, many electronic devices (e.g., digital cameras, scanners, among others) produce raster images.

Because of the advantages of vector drawings over raster images, it can be desired to convert raster images to vector drawings. Conventional image conversion systems generally offer two options for converting a raster image to a vector image. One example of a conventional image conversion system can require a user to manually trace edges in a raster image. Such a system can track a user interaction manually tracing entire edges in the raster image, and can generate vector curves for the traced edges to convert the raster image to a vector drawing. Systems requiring manual tracing of edges in a raster image are inaccurate and inefficient. For example, such a system requires users to manually trace an entire edge of a raster image by meticulously maneuvering a cursor (e.g., using a pen, a mouse, a finger, or other input mechanism) precisely over the edge desired to be traced. Accordingly, the process of a user manually tracing the edge in a raster image is a tedious and time-consuming process and often results in a user tracing and re-tracing an edge until an accurate line tracing results.

In addition to being extremely burdensome to a user, a manual tracing based system can require considerable processing power and time to convert a raster image to a vector drawing. For instance, manually tracing pixels with a digital tool requires tracking numerous user interactions over a long period of time (in addition to significant training and experience by the user) to achieve adequate results, resulting in a large amount of time being needed to convert the raster image to a vector drawing. Further, even when using the assistance of digital tools, such as a snapping (or magnetic) pen tool, tracing entire edges can produce unsatisfactory results. For example, a manual tracing based system that uses a snapping pen tool can rely on discretized edge data (e.g., small incremental pieces of the edge), rather than entire edges at once, and tracks the discretized edge data such that the discrete steps along the pixels forming the edge are produced in the path. Such a system can result in a jagged or stair-stepped path that does not reflect the overall shape of the underlying object, and can produce undesirable artifacts in the finished artwork. Further, assistive tools (e.g., snapping pen tools) can miss endpoints, corners, and/or sharp turns of edges in the raster image, which can also result in poorly fit curves.

Another example of a conventional image conversion system can employ a batch conversion process that converts an entire raster image to a vector drawing. However, the batch conversion system can also produce inaccurate results and computing inefficiencies. For instance, a batch conversion system processes a raster image by rigidly converting all edges found in the image into parametric curves (e.g., Bézier curves) at the same time. The batch-based solution does not allow for user control over the vector creation process. The designer typically knows which edges they want from the raster image to appear in the final vector drawing. However, because the batch-based solution processes the entire image at once, significant user input may be required after batch processing to delete undesirable and additional curves that are not part of the desired vector drawing, while fixing inaccuracies caused by the batch conversion process (e.g., incorrectly connected edges or inaccurate parametric curves). Since the designer knows exactly which edges are needed for the vector artwork, this "weeding out" represents tedious extra work and increases time for generating raster images as users find and fix unnecessary or erroneous parametric curves. Further, in some cases, converting all edges in the raster image causes computing devices to waste unnecessary processing power and memory resources. For instance, batch based image conversion systems can utilize a large amount of processing resources to convert edges from the raster image into vectors, which are then removed and/or corrected based on the "weeding out" processed described above.

Techniques and systems are needed to make the conversion process from raster images to vector drawings more user-friendly and efficient.

SUMMARY

An image conversion system and related techniques are described herein that perform content aware image conversion (e.g., to convert a raster image to a vector drawing). In some examples, an edge detection process is performed on the visible portion of a raster image. An edge map can be generated based on the results of edge detection. In some cases, the edge map includes digital representation of the edges in the raster image, such as a bitmap. The edge map can be used to determine one or more edges in the raster image that correspond to a user interaction with a graphical user interface displaying the raster image.

In some examples, a user can perform a tracing operation using an input device (e.g., a pointing device such as a pen, a touch interface such as a touchscreen or touchpad, a mouse, or other input device) to trace a path over or proximate to an edge depicted in the raster image displayed on the graphical user interface. As the user performs a tracing operation, the system detects (e.g., using the edge map) the points corresponding to the edge and accumulates the detected points along the edge. Edge information from the edge map is used to determine the edge points to accumulate as the user input is received tracing over or proximate to the edge, even if an input position (e.g., a cursor location) corresponding to the user input is not directly on the edge. For example, if the input position is near the edge (e.g., a point associated with an input position of the user input does not intersect with an edge point in the edge map), a neighborhood of points of the edge map relative to the input position can be used to detect an edge point belonging to the edge. In some cases, a check can be performed to determine whether a detected edge point belongs to a same edge as a previous edge point determined during the tracing operation. In some cases, a different edge point can be selected if a detected edge point does not belong to the same edge as the previous edge point. In some cases, if the path of the tracing operation moves from one edge to another, the two edges can be connected. Using such a technique, an edge can be detected and tracked even if the path associated with the tracing operation does not trace exactly along the edge.

Once a path is traced, a series of parametric curves (e.g., Bézier curves) can be fitted to the accumulated points, producing an accurate and smooth curve that depicts the one or more edges in the raster image. For example, after each tracing operation, the accumulated edge points can be interpolated as Bézier curves.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing:

FIG. 7 is a flowchart illustrating an example of a process of generating a vector drawing from a raster image, in accordance with some examples provided herein.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, two common types of image files include raster images and vector drawings (or vector images or vector graphics). A raster image refers to an electronic or digital image made up of pixels. For example, each pixel in a raster image can include one or more color components that define the color for that pixel. The color components making up the pixels can include red (R), green (G), and blue (B) color components, luma (Y) and chroma (e.g., chroma-red (Cr) and chroma-blue (Cb)) color components, or other color components. The pixels of a raster image are generally arranged in a two-dimensional grid. Raster images can be created using pixel-based programs or can be captured with a camera, scanner, or other image capture device. Common examples of raster image file formats include graphics interchange format (GIF), joint photographic experts group (JPEG), portable network graphics (PNG), tagged image file format (TIFF) files, among others.

Figure 1A:
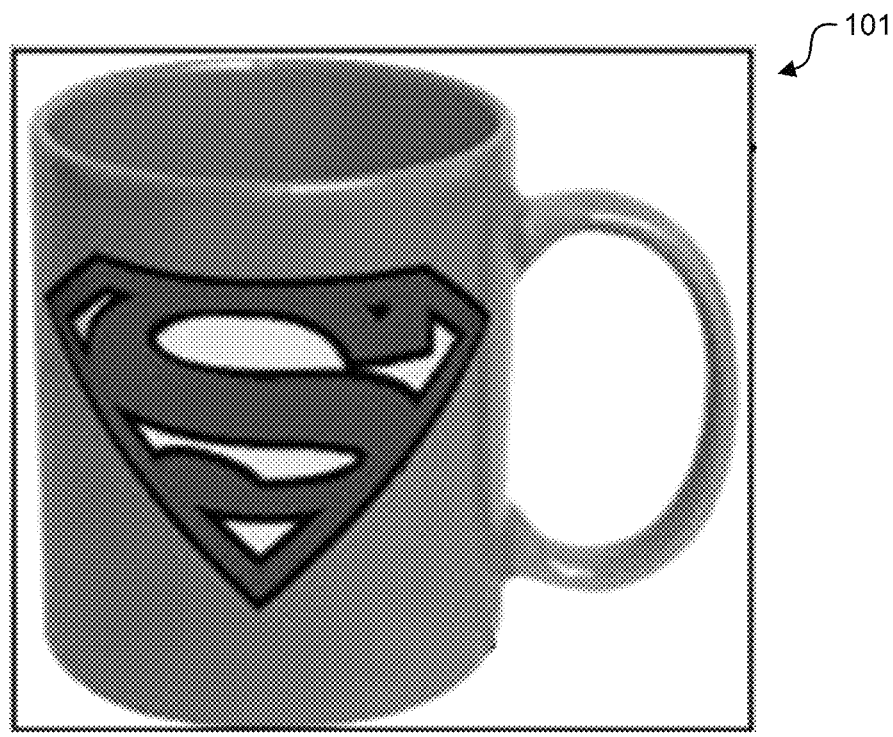
FIG. 1A is an example of a raster image.

FIG. 1 is an example of a raster image 101 depicting a coffee mug as a raster element. A raster element refers to an item or object portrayed in a raster image. For example, a raster element can include a collection of pixels portraying a foreground object or a background object in a raster image. In the example of FIG. 1, the coffee mug is an example of a raster element. In some cases, the design of the "s" on the coffee mug can also include a raster element. As another example, for a raster image depicting a dog, a raster element can include pixels portraying the dog.

Raster images have fixed resolutions. For example, an image can have a fixed resolution of 1216×912 pixels (including a total of 1,109,000 pixels). Due to the fixed resolution of raster images, zooming in (enlarging) on a raster image results in blurring and/or digital artifacts, as the grid of pixels is magnified without introducing more information. In one example, when a raster image is enlarged without changing the number of pixels, the image will look blurry. In another example, when a raster image is enlarged and additional pixels are added, the pixels are typically randomly added throughout the image, which can introduce artifacts in the image.

Figure 1B:
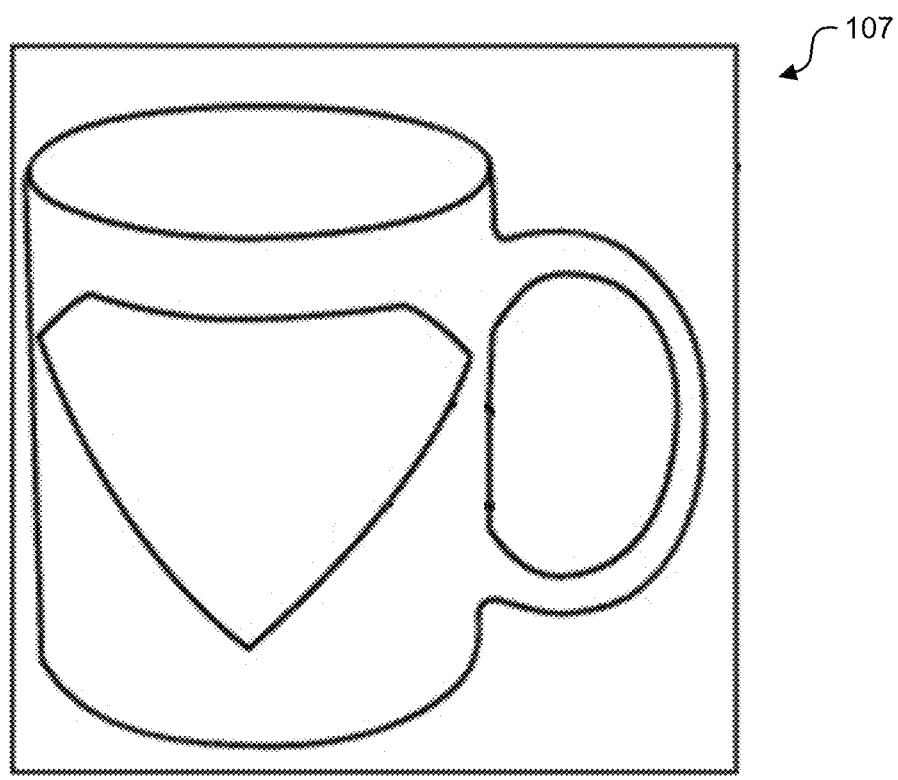
FIG. 1B is an example of a vector drawing.

As noted above, another common types of image file is a vector drawing. FIG. 1B is an example of a vector drawing 107 depicting a coffee mug. A vector drawing is a digital image that includes points, lines, and/or curves related to one another using mathematical formulas. A vector drawing can include one or more vector drawing segments or curves. A vector drawing segment refers to a vector-based curve or line within a vector drawing. In some examples, a vector drawing segment includes a single scalable curve within a vector drawing, a combination of scalable curves, or a scalable straight line. A vector drawing segment includes any parametric (e.g., cubic polynomial) curve formulation that is able to interpolate a dense array of points. For example, a vector drawing can be defined by mathematical calculations from one point to another that form the vector drawing segments.

In some implementations, a vector drawing segment includes a cubic Bézier segment (e.g. a single cubic curve defined by four control points), a cubic Bézier curve (e.g., one or more connected cubic Bézier segments), a Bézier path (e.g., a combination of Bézier curves and straight lines), or the like. A Bézier curve refers to a parametric curve used to model smooth curves. A Bézier curve includes one or more cubic Bézier segments, where each Bézier segment is defined by multiple points (e.g., a start point, an end point, and two control points). In some examples, a Bézier curve can include Bézier segments defined for any degree (e.g., linear, quadratic, cubic, etc.). While Bézier segments and curves are used herein as examples of vector drawing segments, the image conversion systems and techniques described herein may additionally or alternatively use other forms of parametric segments and curves as vector drawing segments, such as Hermite curves, B-splines, non-uniform rational basis splines, Kappa-curves, Catmull-Rom splines, any combination thereof, and/or another parameter curves that are able to approximate a dense series of points.

Unlike raster images, vector drawings are scalable to any size without losing quality in color or smoothness (e.g., without creating blurring or artifacts) and, in many cases, are stored more compactly than raster images. For example, because vector drawings employ mathematical equations to represent edges rather than a grid of pixels, zooming in on a vector drawing does not cause aliasing or digital artifacts to appear along the edges of a vector drawing segment. Common examples of vector-capable file formats include SVG, EPS, and PDF files.

Many electronic devices (e.g., digital cameras, scanners, among others) produce raster images instead of vector images. Because of the above-described advantages of vector drawings over raster images, a user-friendly and efficient system is needed for converting raster images to vector drawings. An image conversion system and associated techniques are described herein that can provide content aware content aware image conversion of raster images to vector drawings. The image conversion system eliminates the need for wasteful batch processing operations and other unnecessary operations of conventional image conversion systems by efficiently and selectively transforming edges of a raster element (e.g., foreground object) shown in a raster image to a vector drawing. Further, the image conversion system advantageously reduces the overall number of user interactions required to produce a vector drawing by intelligently determining an edge being selected by a user even when an input position (e.g., a cursor location) corresponding to the user input is not directly on the edge.

Figure 2:
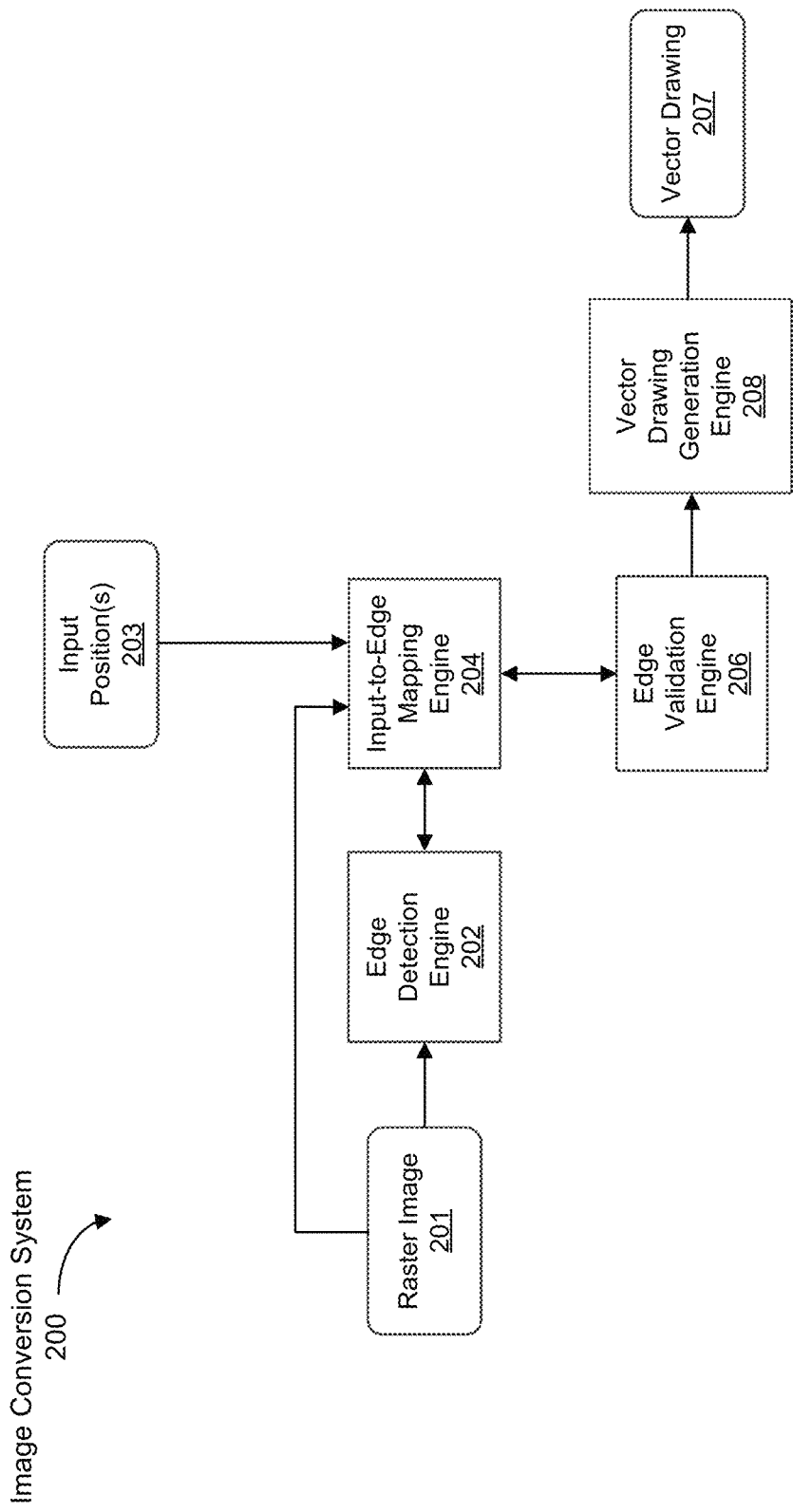
FIG. 2 is a block diagram illustrating an example of an image conversion system, in accordance with some examples provided herein.

FIG. 2 is a block diagram illustrating an example of an image conversion system 200. Based on a user interaction associated with an input raster image 201, the image conversion system 200 can use edge information determined from the raster image 201 to determine an edge associated with the user interaction. Edge points can be determined based on the user interaction when an input position (e.g., a cursor location) corresponding to the user interaction is directly on an edge and also when an input position is not directly on the edge. In some implementations, the image conversion system 200 performs an edge validation check to determine whether a detected edge point belongs to a same edge as a previous edge point determined for the user interaction. Once a path along one or more edges of the raster image 201 is traced, accumulated edge points along the path can be used to generate a vector drawing 207. Further details regarding example operations of the image conversion system 200 are described below.

The image conversion system 200 includes various components, including an edge detection engine 202, an input-to-edge mapping engine 204, an edge validation engine 206, and a vector drawing generation engine 208. The components of the image conversion system 200 can include software, hardware, or both. For example, in some implementations, the components of the image conversion system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the image conversion system 200.

While the image conversion system 200 is shown to include certain components, one of ordinary skill will appreciate that the image conversion system 200 can include more or fewer components than those shown in FIG. 2. For example, the image conversion system 200 can include, or can be part of a computing device that includes, one or more input devices and one or more output devices (not shown). In some implementations, the image conversion system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

As noted above, the image conversion system 200 can be implemented by and/or included in a computing device. In some cases, multiple computing devices can be used to implement the image conversion system 200. For example, a computing device used to implement the image conversion system 200 can include a personal computer, a tablet computer, a mobile device (e.g., a mobile phone or other mobile device), a wearable device (e.g., a smart watch, a virtual reality headset, an augmented reality headset, and/or other wearable device), a server (e.g., in a software as a service (SaaS) system or other server-based system), and/or any other computing device with the resource capabilities to perform the techniques described herein.

In some implementations, the image conversion system 200 can be integrated with (e.g., integrated into the software, added as one or more plug-ins, included as one or more library functions, or otherwise integrated with) one or more software applications, such as a design application (e.g., Adobe InDesign™, Adobe Illustrator™, Adobe Acrobat™, Adobe Photoshop™, Adobe After Effects™, among others) that allows a user (also referred to as an end-user) to design and/or edit images. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application. In some implementations, the image conversion system 200 can be implemented in a suite of software applications.

Figure 3A:
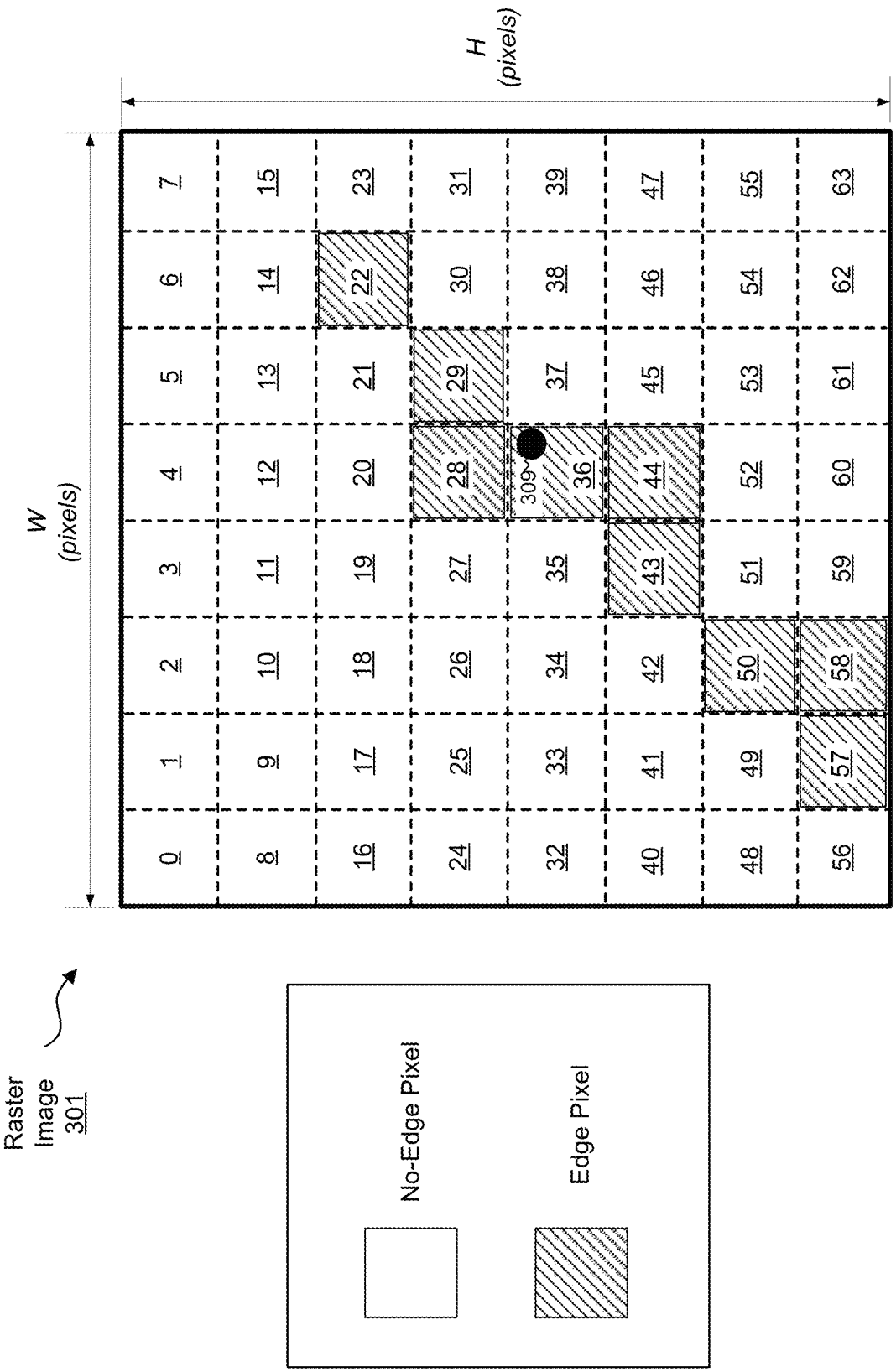
FIG. 3A is a conceptual diagram illustrating an example of a raster image, in accordance with some examples provided herein.

The edge detection engine 202 of the image conversion system 200 can obtain the input raster image 201 as input. In some examples, the raster image 201 can be created using the image conversion system 200 (e.g., using an image design and/or editing application that includes the image conversion system 200). In some examples, the raster image 201 can be created using a separate application or system (e.g., an image editing system and/or application), and provided to the image conversion system 200 for conversion to a vector drawing. The raster image 201 includes an array or grid of pixels (e.g., a two-dimensional array or grid of pixels). Each pixel includes one or more color components (e.g., RGB color components, YCbCr color components, or other color components) defining the color for each pixel. The raster image 201 can be in any suitable raster image file format, such as a GIF format, a JPEG format, a PNG format, a TIFF format, or other raster image file format. An example of a raster image 301 is illustrated in FIG. 3A (described below).

The raster image 201 can be provided for display by the image conversion system 200 or by another system that includes the image conversion system 200 (e.g., an image editing system and/or application). In some examples, the raster image 201 can be displayed on a graphical user interface of the image conversion system 200 or the other system that includes the image conversion system 200 (e.g., an image editing system and/or application). A user can create the raster image 201 and/or can edit the raster image 201 using the graphical user interface. As described in more detail below, a user can interact with the raster image 201 using the graphical user interface to indicate edges that are to be included in the vector drawing 207 generated based on the raster image 201.

The edge detection engine 202 operates to detect or identify one or more edges in the raster image 201. In some examples, the edge detection engine 202 can detect edges based on sharp changes in image brightness, shading, and/or color within the raster image 201. In one illustrative example, the edge detection engine 202 can use Canny edge detection to detect edges in the raster image 201. For instance, the image conversion system 200 can utilize the Canny Edge Detection Algorithm described in Canny, J., A Computational Approach To Edge Detection, IEEE Trans. Pattern Analysis and Machine Intelligence, 8(6):679-698, 1986, which is incorporated herein by reference in its entirety and for all purposes. In other examples, the edge detection engine 202 can use other edge detection methods or processes to detect edges in the raster image 201 (and in some cases to generate an edge map for the raster image 201, as described below). In some examples, the image conversion system 200 performs pre-processing on the raster image 201 to improve edge detection. For instance, the image conversion system 200 can apply one or more filters that minimize color, reduce noise, and/or increase the contrast of the raster image 201. In one illustrative example, the image conversion system 200 can apply a bilateral filter to reduce noise while retaining edge sharpness of the raster image 201 before performing edge detection.

In some examples, the edge detection engine 202 generates an edge map of the raster image 201 using the results of the edge detection. The edge map is a digital representation of the one or more detected edges of the raster image 201. The edge map can be used (e.g., by the input-to-edge mapping engine 204) to determine where edges are detected in the raster image 201. In some examples, the edge map need not be displayed (e.g., in the graphical user interface displaying the raster image 201), and can be generated and used for performing the image conversion techniques described herein. In some examples, the edge map can be displayed (e.g., in a graphical user interface), such as upon selection of an option by a user to display the edge map.

In some implementations, regardless of the edge detector or algorithm used to detect the edges in the raster image 201, when generating the edge map, edge detection engine 202 can ensure that detected edges in the raster image 201 are represented as single-pixel-wide (1-pixel wide) lines in the edge map. In some instances, the edge detection engine 202 can represent a thicker line or shape in the raster image 201 (e.g., a line or shape that is at least three-pixels wide) using multiple single-pixel-wide lines. When a thicker line or shape is depicted in the raster image 201, the edge detection engine 202 can identify multiple edges associated with the line or shape (e.g., a shape with an inner edge and an outer edge or a line with two outer edges). For example, if a border around a raster element in the raster image 201 is thicker, the edge detection engine 202 can detect an outer single-pixel-wide line and an inner single-pixel-wide line in the corresponding edge map.

The edge map can include a file, a matrix, an array, a digital collection, or other digital representation defining the pixels of the raster image 201 that form the edges. In one illustrative example, the edge map can include an array or grid of points with values defining whether pixels in the raster image 201 belong to an edge or do not belong to an edge. In some examples, the edge map can include a first value (e.g., a value of 0) for points of the edge map corresponding to pixels of the raster image 201 that do not belong to an edge (referred to herein as a non-edge pixels) and a second value (e.g., a value of 1) for points of the edge map corresponding to pixels of the raster image 201 that are part of an edge (referred to herein as edge pixels). An example of a raster image 301 and a corresponding edge map 310 (as a bitmap) are described below with respect to FIG. 3A and FIG. 3B.

Figure 6A:
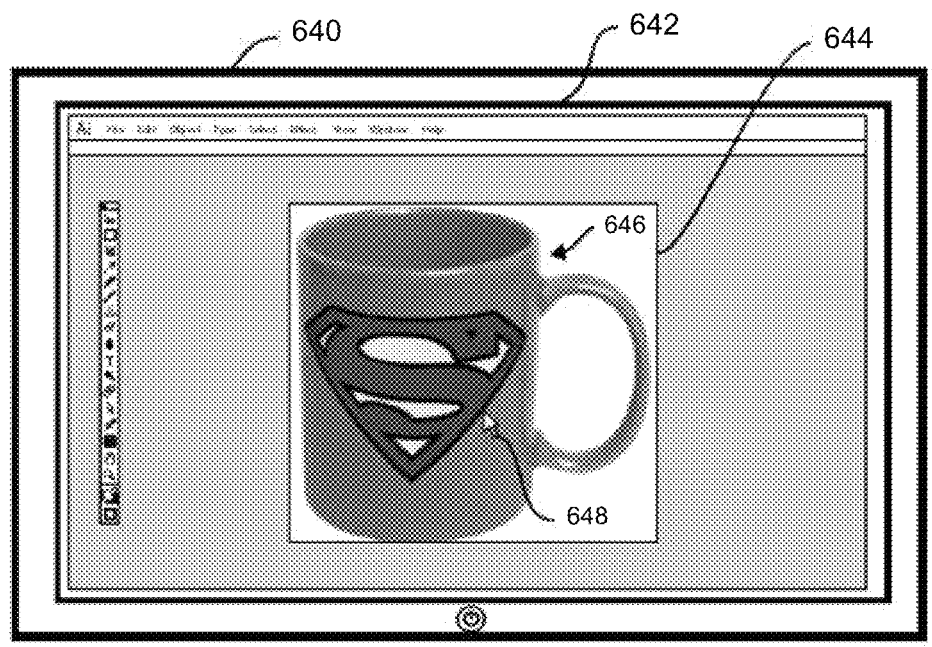
FIG. 6A-FIG. 6E are diagrams illustrating an example of converting a raster image to a vector drawing, in accordance with some examples provided herein.

In some examples, the image conversion system 200 can generate the edge map upon receiving a request from a user to selectively transform edges of the raster image 201 into a vector drawing (e.g., transform the raster element 646 in the raster image 644 of FIG. 6A into a vector drawing segment). In some examples, the conversion system 200 automatically generates the edge map, for example, upon loading the raster image 201 or detecting a selection of a particular image editing tool.

FIG. 3A is a conceptual diagram illustrating an example of a raster image 301. The raster image 301 includes a W×H array of pixels, where W and H are integer values. The value of W and the value of H can be equal or can be different values. In the example shown in FIG. 3A, the value of W is equal to 8, and the value of H is equal to 8, in which case the raster image 301 has a resolution of 8×8 pixels. The pixels of the raster image 301 are sequentially numbered in FIG. 3A from 0 to 63. Each pixel in the raster image 301 can correspond to a location or coordinate within the array of pixels. In some cases, the location can be represented with a (row, column) notation. For example, the pixel numbered with a 0 in FIG. 3A corresponds to a location of (0, 0) in the pixel array (where row=0 and column=0), the pixel numbered with a 1 corresponds to a location of (0, 1), the pixel numbered with a 2 corresponds to a location of (0, 2), the pixel numbered with a 8 corresponds to a location of (1, 0), the pixel numbered with a 63 corresponds to a location of (7, 7), and so on. As noted above, each pixel includes one or more color components (e.g., RGB color components, YCbCr color components, or other color components) defining the color for each pixel.

Edge pixels in the raster image are shown in FIG. 3A with a diagonal hashed pattern. The edge pixels in FIG. 3A include the pixel numbered with a 22 at a location of (2, 6), the pixel numbered with a 28 at a location of (3, 4), the pixel numbered with a 29 at a location of (3, 5), the pixel numbered with a 36 at a location of (4, 4), the pixel numbered with a 43 at a location of (5, 3), the pixel numbered with a 44 at a location of (5, 4), the pixel numbered with a 50 at a location of (6, 2), the pixel numbered with a 57 at a location of (7, 1), and the pixel numbered with a 58 at a location of (7, 2).

Figure 3B:
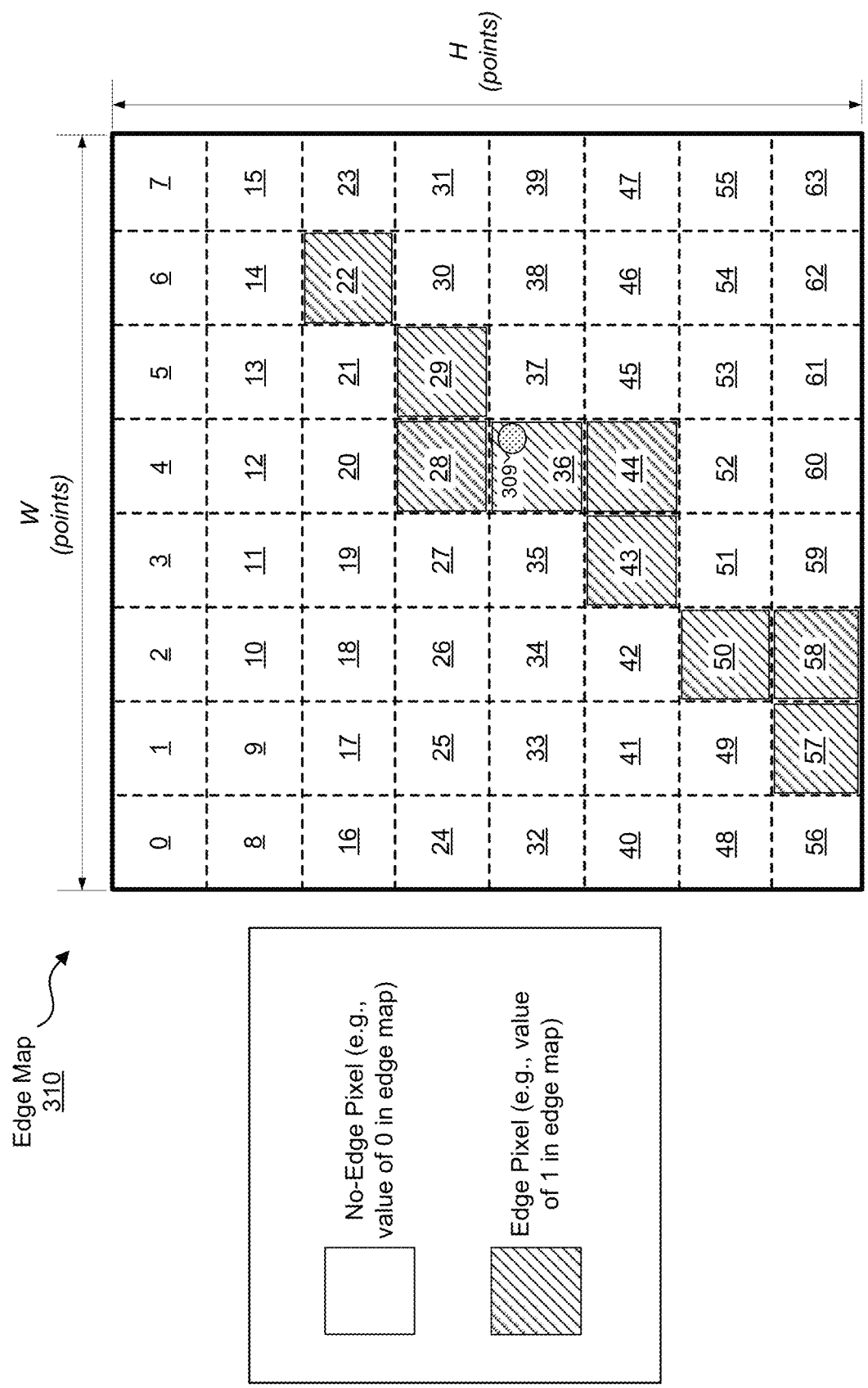
FIG. 3B is a conceptual diagram illustrating an example of an edge map, in accordance with some examples provided herein.

FIG. 3B is a conceptual diagram illustrating an example of an edge map 310 generated using results of edge detection performed on the raster image 301. The edge map 310 has a same resolution as the raster image 301, and thus includes a W×H array of points. For instance, similar to that of the raster image 301 in FIG. 3A, the value of W for the edge map 310 is equal to 8, and the value of H is equal to 8. The raster image 301 thus has a resolution of 8×8 points. In some implementations, an edge map can have a different resolution as that of a raster image used to generate the edge map. As shown in FIG. 3B, the points of the raster image 301 are also sequentially numbered from 0 to 63. Each point in the edge map 310 has a same location or coordinate as a corresponding pixel in the raster image 301. For example, point numbered with a 0 in FIG. 3B is at a location of (0, 0) in the point array (where row=0 and column=0), and corresponds to the pixel numbered with a 0 in the raster image 301 of FIG. 3A. In another example, the point numbered with an 8 in FIG. 3B is at a location of (1, 0) in the point array (where row1 and column=0), and corresponds to the pixel numbered with an 8 in the raster image 301 of FIG. 3A.

Each point in the edge map 310 has one of two possible values. In one illustrative example, a value of 0 is assigned to points of the edge map 310 corresponding to non-edge pixels of the raster image 301 (pixels that do not belong to an edge) and a value of 1 can be assigned to points of the edge map 310 corresponding to edge pixels of the raster image 301 (pixels that belong to an edge, shown in FIG. 3A and FIG. 3B with a diagonal hashed pattern). In one illustrative example, the pixel numbered with a 36 in the raster image 301 of FIG. 3A can include an edge pixel and the pixel numbered with a 35 can include a non-edge pixel. In such an example, the point numbered with a 36 in the edge map 310 of FIG. 3B (which corresponds to the pixel number 36 in the raster image 301) can be assigned a value of 1 to indicate the point 36 is associated with an edge pixel. The point numbered with a 35 in the edge map 310 (which corresponds to the pixel number 35 in the raster image 301) can be assigned a value of 0 to indicate the point 35 is associated with a non-edge pixel.

Returning to FIG. 2, the image conversion system 200 can detect a user interaction with the raster image 201 indicating a desire to transform one or more edges of the raster image 201 to one or more vector drawing segments for the vector drawing 207. A user interaction refers to one or more user inputs received in response to a user's interaction with a graphical user interface or other interface. For example, as noted above, the raster image 201 can be displayed by a graphical user interface. A user can operate an input device to move a cursor displayed on the graphical user interface on or proximate to an edge of the raster image 201. While a cursor is used herein as an indication of an input position, other indications of an input position can also be used. The input device can include a mouse, a touch interface such as touchscreen, a touchpad, or other touch interface, an electronic pen or other pointing device, a keyboard, a gesture-based input device (e.g., one or more cameras and/or other sensor(s)), a voice-based input device, any combination thereof, and/or other input device. The input received using the input device can include the click of a mouse button, a touch input of a touchscreen or touchpad such using a finger, an electronic pen, or other tool, one or more key presses of a keyboard, one or more gesture inputs, one or more voice inputs, any combination thereof, and/or other input.

In some cases, the image conversion system 200 can detect the user interaction based on the user selecting an edge tracing option. Selection of the edge tracing option indicates the beginning of a tracing operation to trace an edge of a raster element in the raster image 201 (e.g., an object or part of an object, such as a coffee mug, a dog, a car, or other object depicted in the raster image 201). In some examples, the edge tracing option can include a virtual button, icon, or other virtual option (e.g., a virtual option displayed on a touch interface, a virtual option displayed on a virtual reality or augmented reality device, or other virtual option) that is selectable by the user interaction (e.g., using touch input, gesture input, voice input, any combination thereof, and/or other input). In some examples, the edge tracing option can include a physical button of an input device (e.g., on a mouse, a keyboard, a virtual reality headset or glasses, an augmented reality headset or glasses, or other device). Any other type of selectable option can be provided for a user to select the edge tracing operation.

Once the user selects the edge tracing operation, the user can trace along or near an edge of a raster element in the raster image 201. One or more input positions 203 are provided to the image conversion system 200 as the user traces along or near the edge. As described below, the one or more input positions 203 can be used to determine an edge associated with the tracing operation, and one or more vector drawing segments can be generated for the edge. The user can indicate an end of the tracing operation by selecting the edge tracing option a second time or by providing an additional input (e.g., selecting an additional option, releasing a mouse button, releasing a touch input using a finger or pointing device, or other input) that indicates the end of a tracing operation.

In some cases, the image conversion system 200 can detect the user interaction (e.g., automatically) based on a triggering event, such as the user moving the cursor on or proximate to an edge of the raster image 201, based on a user making contact with a touch interface (e.g., touching an electronic pen or finger to a touchscreen or touchpad), or based on some other triggering event. In such cases, once the user interaction is detected, the one or more input positions 203 can be provided to the image conversion system 200 as the user traces along or near the edge.

The user inputs associated with the user interaction can correspond to one or more input positions 203 in the raster image 201 and in the edge map. The input-to-edge mapping engine 204 can use the one or more input positions 203 and the edge map to determine an edge associated with the tracing operation. For example, the image conversion system 200 can detect a user interaction from the user moving a cursor over the raster image 201. As noted above, the one or more input positions 203 can be provided to the image conversion system 200 as the user traces along or near an edge in the raster image 201 (e.g., in response to the user selecting the tracing operation or in response to detecting a triggering event). An input position refers to a position (e.g., denoted as an (x, y) coordinate) in the raster image 201 to which a user input corresponds. For instance, an input device can report cursor positions or coordinates at periodic intervals of time (e.g., every 5-15 milliseconds (ms) or other period of time), such as to an operating system of the computing device implementing the image conversion system 200. The periodic interval can depend on the hardware and/or operating system of the system. Referring to FIG. 3A as an illustrative example, a cursor 309 is shown as overlapping the pixel numbered with a 36 in the raster image 301. The position of the cursor 309 in FIG. 3A is based on a user input at a given point in time.

The input-to-edge mapping engine 204 can determine a point in the edge map corresponding to each input position of the one or more input positions 203. To determine a point in the edge map corresponding to an input position (e.g., of a cursor), the image-to-edge mapping engine 204 can map the input position from the raster image 201 to a point in the edge map. For example, the image-to-edge mapping engine 204 can detect the (x, y) coordinates in the raster image 201 for a given cursor position associated with a user input. The image-to-edge mapping engine 204 can map the (x, y) coordinates of the raster image 201 to (x, y) coordinates of the edge map. As previously described, the raster image 201 and the edge map can have a same resolution in some implementations, in which case the size (e.g., a number of rows and columns) of the raster image 201 and the edge map are of a same size. In cases when the raster image 201 and the edge map have the same resolution, the input position in the raster image 201 corresponds to the same position in the edge map (e.g., the raster image 201 and the edge map have a one-to-one pixel-to-point correspondence). For instance, referring to FIG. 3A and FIG. 3B, the cursor 309 is shown in the same position in the edge map 310 (over point 36) as it is in the raster image 301 (over pixel 36). The cursor 309 is shown in FIG. 3B with a dotted pattern for illustrative purposes, indicating that the cursor 309 may not actually be displayed with the edge map 310.

Using a point of the edge map associated with an input position (e.g., the coordinates in the edge map mapped from the raster image 301), the image-to-edge mapping engine 204 can determine an edge point in the edge map to associate with the input position. For example, the image-to-edge mapping engine 204 can perform a search process to search for an edge point in the edge map that is nearest to the input position by searching a neighborhood of one or more points associated with the point of the edge map. The search process allows for accurate detection of an edge that a user is tracing, even if the path associated with the tracing operation does not track exactly along the edge (e.g., when one or more of the input positions corresponding to the user input are not directly on the edge). The search process provides a benefit of allowing a user to approximately trace an edge, while continuing to generate an exact track along the edge, which requires considerably less effort for a user as compared to systems that require a user to carefully follow an edge pixel by pixel. In some examples, a validation check can be performed by the edge validation engine 206 to determine whether a detected edge point belongs to a same edge as a previous edge point determined during the tracing operation. Details regarding a search process for searching for edge points to associate with input positions and a validation check process are described below with respect to FIG. 4-FIG. 5B.

The edge points determined for the one or more input positions 203 corresponding to the tracing operation along one or more edges of the raster image 201 can be used by the vector drawing generation engine 208 to generate the vector drawing 207. For example, the vector drawing generation engine 208 can identify the pixels in the raster image 201 that have a same location or coordinate as the detected edge points in the edge map. The identified pixels are referred to as edge pixels. In some cases, edge pixels along the one or more traced edges of the raster image are accumulated and stored in an array or other data structure, and processed to generate one or more vector drawing. The vector drawing generation engine 208 can transform the edge pixels into a vector drawing segment by fitting a Bézier curve to the edge pixels. The vector drawing generation engine 208 can use the coordinates of the edge pixels to fit a Bézier curve to the edge pixels. In some cases, the vector drawing generation engine 208 can fit multiple Bézier curves to a line of edge pixels to ensure a smooth, accurate, and close fit to the edge in the raster image 201.

In some examples, each smooth segment of a polyline is processed by a Bézier curve fitting algorithm, such as that described in Boem et. al., "A Survey of Curve and Surface Methods in CAGD", CAGD, v1(1), 7/84, p. 21, section 24, which is hereby incorporated by reference in its entirety and for all purposes. A polyline is a line made up of multiple vector drawing segments drawn between edge pixels (also referred to as polyline edge coordinates). In some implementations, the fitting algorithm can use a least-squares fitting method to compute an optimal curve representation for the smooth segment of edge pixels.

For example, to generate Bézier curves for each group of pixels of an edge using a Bézier curve fitting algorithm, the vector drawing generation engine 208 can utilize the following formula to approximate a Bézier curve segment from the sample points in a pixel line, as shown in Equation 6.

$$P = (B^T B)^{-1} \times (B^T S) \qquad \text{Equation (1)}$$

where P represents the control points for a Bézier curve, and S represents n pixel coordinates (e.g., the number of pixel sample points) in the edge or a portion of an edge being fitted with a Bézier curve. The term B represents a matrix of cubic Bézier coefficients for equally spaced points and can be defined as follows:

$$u = \frac{i}{n-1}$$ Equation (2)

$$B_j(u) = \frac{6}{j!(3-j)!} u^j (1-u)^{3-j}$$ Equation (3)

$$B_{i,j} = B_j(u_i)$$ Equation (4)

As shown in Equations 2-4, the vector drawing generation engine 208 fits a Bézier curve to a pixel line of an edge using a least-squares fitting method by using a matrix of cubic Bézier coefficients, where j is a value such as 0.3.

Because the image conversion system 200 employs a uniform stepping amount (e.g., 1-pixel wide edges) in some cases, the matrices of Bézier coefficients ($B^T$ and $(B^T B)^{-1}$) are constant for pixel lines having the same number (denoted as n above) of pixels. For example, if the image conversion system 200 identifies multiple pixel lines that are 5-pixels long, the image conversion system 200 generates the Bézier coefficients matrix once and reuses the Bézier coefficient matrix to fit a Bézier curve to each subsequent pixel line of five pixels, even if each of the pixel lines vary in direction, shape, or curvature.

In some cases, upon initially fitting a Bézier curve to a pixel line of an edge, the image conversion system 200 can measure the accuracy of the fit. The accuracy of the fit of a Bézier curve can be measured by comparing the distance of points on the Bézier curve to the edge pixel points. For example, the image conversion system 200 can compare the distance between points along the pixel line to the initial Bézier curve to determine if the distance is greater than the error threshold. If the distance between a pixel on the pixel line and the initial Bézier curve (referred to the fit error) exceeds the error threshold, the pixel line can be subdivided and the fitting process is repeated on the smaller segments. For example, the vector drawing generation engine 208 can subdivide the pixel line of an edge and re-fit the line with an additional Bézier curve. The image conversion system 200 repeats the process of measuring and subdividing until a fit is obtained to generate a smooth curve segment (i.e., the vector drawing segment). When the fitting process is finished for each smooth segment, the segments are joined together into a composite Bézier curve.

Figure 4:
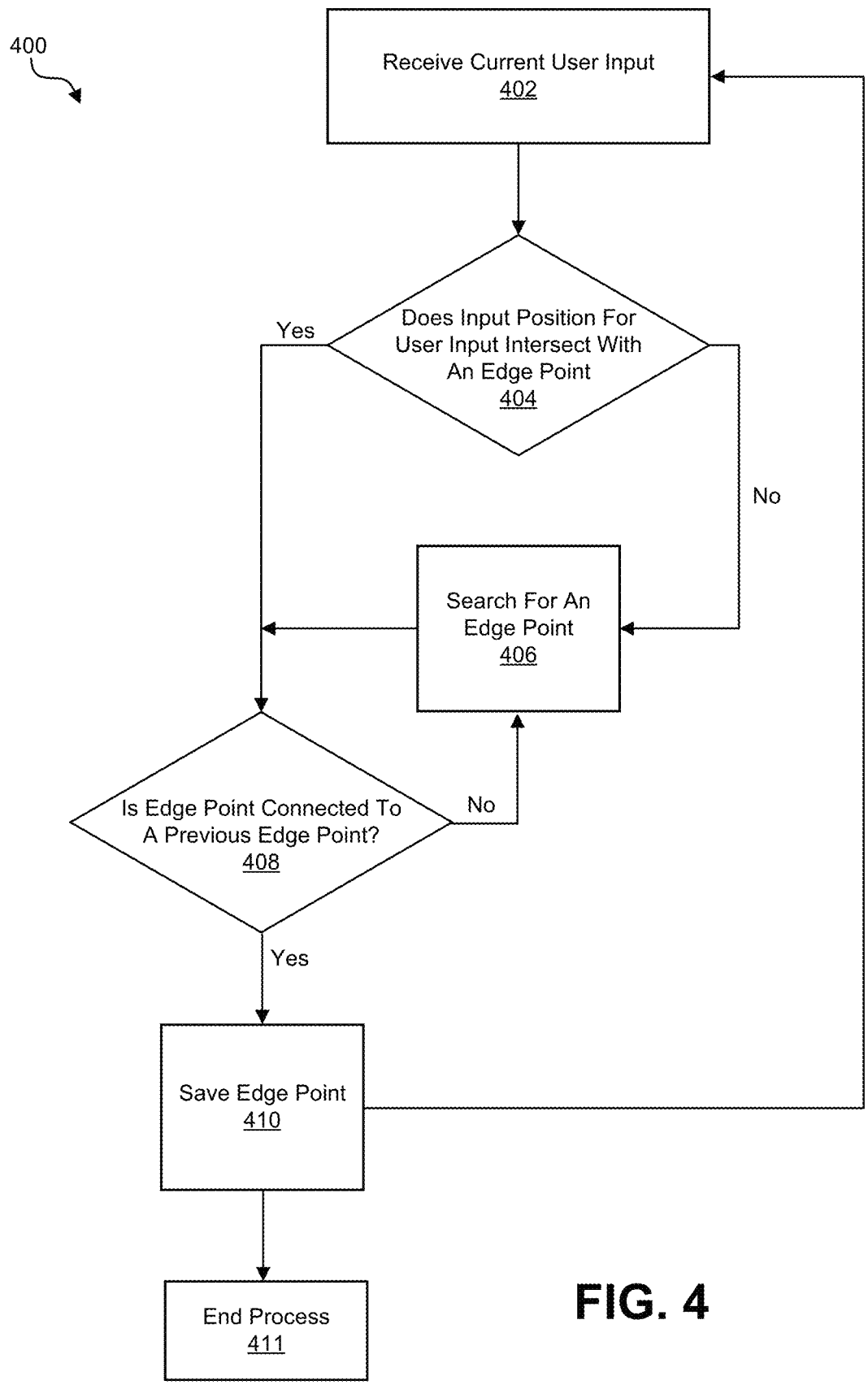
FIG. 4 is a flowchart illustrating an example of a process of searching for an edge pixel corresponding to an input position, in accordance with some examples provided herein.
Figure 5A:
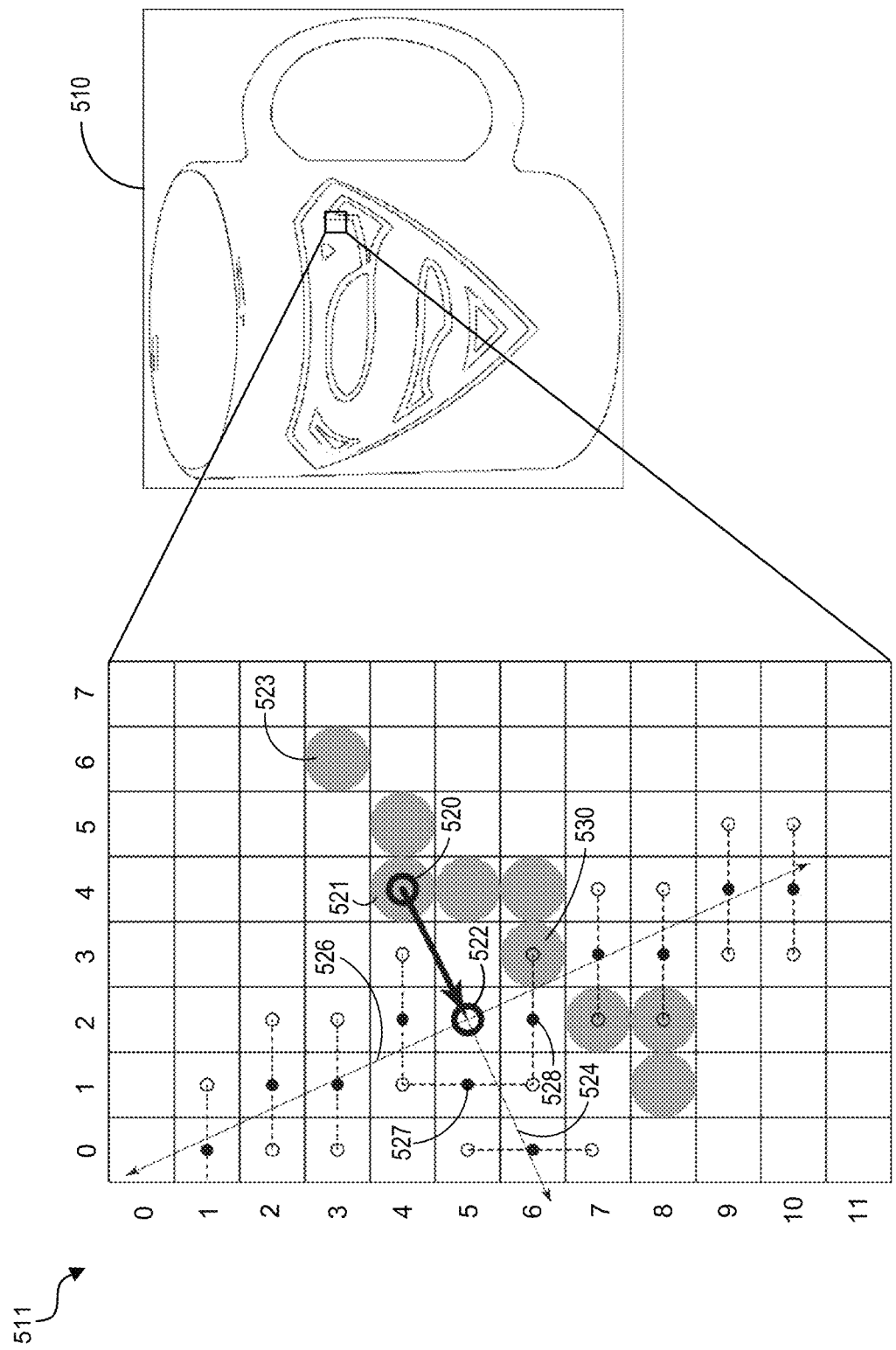
FIG. 5A is a diagram illustrating an example of searching a neighborhood of points relative to an input position to find one or more edge points, in accordance with some examples provided herein.
Figure 5B:
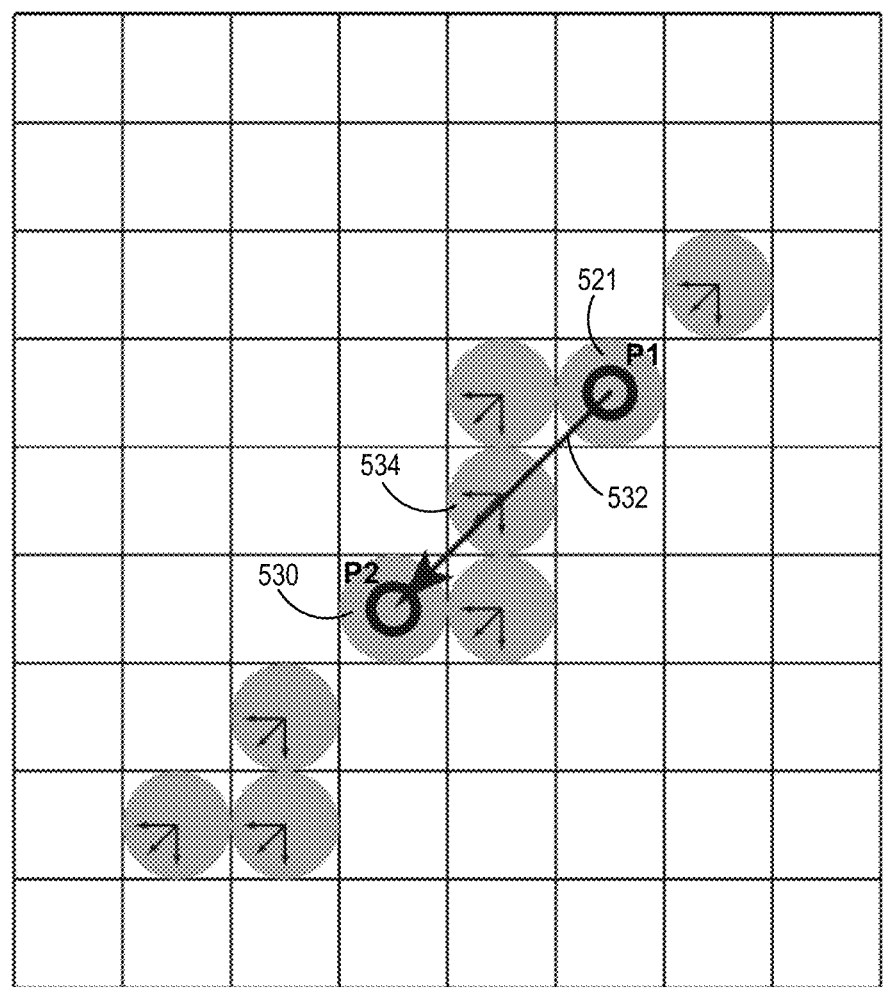
FIG. 5B is a diagram illustrating an example of validating whether an edge point is connected with one or more previous edge points, in accordance with some examples provided herein.

Details regarding the search process and the validation check noted above will now be described with respect to FIG. 4-FIG. 5B. FIG. 4 is a flowchart illustrating an example of a process 400 of searching for an edge pixel corresponding to an input position. The process 400 can be implemented using the input-to-edge mapping engine 204, the edge validation engine 206, and/or other components of the image conversion system 200. The operation of the process 400 of FIG. 4 will be discussed with respect to the diagrams illustrated in FIG. 5A and FIG. 5B. FIG. 5A is a diagram illustrating an example of searching a neighborhood of points relative to an input position to find one or more edge points in an edge map 510. An enlarged portion 511 of the edge map 510 is also shown in FIG. 5A. FIG. 5B is a diagram illustrating an example of validating whether an edge point in the edge map 510 is connected with one or more previous edge points. Each square in the portion 511 of the edge map 510 corresponds to a point in the portion 511 of the edge map 510, and is associated with a corresponding pixel (at a same location or coordinate) in a raster image used to generate the edge map 510. The columns of the points in the portion 511 of the edge map 510 are numbered from 0 to 7, and the rows are numbered from 0 to 11. The large circles in the portion 511 of the edge map 510 are edge points (e.g., edge point 523) detected by the edge detection engine 202.

At block 402, the process 400 includes receiving a current user input. The current user input is the input currently being processed by the image conversion system 200. The current user input can be received in response to a user's interaction with a graphical user interface or other interface to begin or continue a tracing operation along an edge in a raster image. For example, as described previously, a user can select an edge tracing option and can operate an input device to move a cursor displayed on the graphical user interface along a path on or proximate to an edge of a raster image. As the user moves the cursor using the input device, the image conversion system 200 or device or application operating the image conversion system can track the movement of the cursor relative to the edge for the tracing operation, and can save (at block 410) validated edge points for use in generating one or more vector drawing segments for the tracing operation.

An input position in the raster image can be determined for the user input. A point in an edge map corresponding to the input position can be determined, as described above. Referring to FIG. 5A, a previous input position 520 is shown as intersecting an edge point 521 at location (4, 4) in the portion 511 of the edge map, and a current input position 522 is shown as intersecting a point at location (5, 2) in the portion 511 of the edge map. The current input position 522 is a position associated with the current user input currently being processed by the image conversion system 200. The previous input position 520 is a position associated with a previous user input that was previously processed by the image conversion system 200 (e.g., the last user input processed by the image conversion system 200).

At block 404, the process 400 includes determining whether the input position for the current user input intersects with an edge point in the edge map. As noted above, the large circles shown in FIG. 5A are edge points (e.g., edge points 521 and 530). As illustrated, the previous input position 520 shown in the portion 511 of the edge map 510 intersects the edge point 521 at location (4, 4), and the current input position 522 intersects with a non-edge point. The edge point at location (4, 4) can include the last edge point that was included in a curve for the vector drawing 207 (e.g., based on the input position 520 being the last user input processed by the image conversion system 200). The process 400 (e.g., implemented by the input-to-edge mapping engine 204) can determine whether an input position intersects with an edge point in the edge map 510 by identifying a value of the point in the edge map 510 that intersects with the input position. As described above, a point in the edge map can have a first value (e.g., a value of 0) indicating the corresponding pixel of the raster image 201 (having a same location or coordinate as the edge map point) is a non-edge pixel or can have a second value (e.g., a value of 1) indicating the corresponding pixel of the raster image 201 is an edge pixel. For example, the input-to-edge mapping engine 204 can determine that the point in the edge map 510 intersecting with the previous input position 520 has a value of 1 (indicating the corresponding pixel of the raster image 201 is an edge pixel) and that the point in the edge map 510 intersecting with the current input position 522 has a value of 0 (indicating the corresponding pixel of the raster image 201 is a non-edge pixel).

If the process 400 determines at block 404 the current input position intersects with an edge point in the edge map, the process 400 continues to block 408 to perform a validation check on the edge point. The validation check is described below with respect to FIG. 5B. If, at block 404, the process 400 determines the current input position does not intersect with an edge point in the edge map, the process 400 searches for an edge point at block 406. For example, the process 400 (e.g., implemented by the input-to-edge mapping engine 204) can perform the search process noted above to search for an edge point in the edge map that is nearest to the current input position by searching a neighborhood of one or more points associated with the point of the edge map. The lines shown in FIG. 5A as extending from the input position 522 represent an illustrative example of a search pattern the input-to-edge mapping engine 204 can use to determine an edge point. For example, a vector 524 (or line) extending from the last edge point on the curve (e.g., the edge point at location (4, 4) overlapping with the previous input position 520) to the current input position 522 can be determined. A vector 526 (or line) extending from the current input position 522 relative to the vector 524 can also be determined. For example, as shown in FIG. 5A, a vector 526 perpendicular to the vector 524 is determined for use as a search pattern in addition to the vector 524. In some cases, more vectors can be determined and used as the search pattern, such as eight vectors emanating from the current input position 522 and separated by 45 degree angles.

The image-to-edge mapping engine 204 can perform the search process by analyzing points (on a point-by-point basis) of the edge map 510 that intersect with the vector 524 or the vector 526 defining the search pattern, in order to determine whether the intersecting points (or neighboring points) are edge points in the edge map 510. The points in the portion 511 of the edge map that intersect with the vector 524 or the vector 526 are shown with solid dots in FIG. 5A, and are referred to as search points. The search points are at the following locations in the portion 511 of the edge map: (1, 0), (2, 1), (3, 1), (4, 2), (5, 1), (6, 0), (6, 2), (7, 3), (8, 3), (9, 4), and (10, 4). The search process can include stepping from search point to search point in the portion 511 of the edge map along the vectors 524 and 526, starting with the search points closest to the point (at location (5, 2)) intersecting with the current input position 522. The search points closest to the point intersecting the current input position 522 can be analyzed first because an edge point closest to the input position 522 is preferred for use in generating a vector drawing segment over edge points that are further from the input position 522. For example, once an edge point closest to the input position 522 is found and is validated using the validation check described below, the edge point can be selected for the input position 522 for use in generating a vector drawing segment. If a closest edge point is not validated as being connected to a previously determined point, as described below, an edge point further away from the input position 522 can be selected for the input position 522. In some cases, the closest edge point must be within an edge distance threshold of the input position to start.

The edge distance threshold can be set to any suitable value, such as 5 pixels, 10 pixels, 15 pixels, 20 pixels, or other suitable value. In some examples, the value of the edge distance threshold depends on the resolution of the image and the resolution of the display. For instance, the value can be set so that it is large enough to not require very careful tracing of the edges to find the edge (the user input does not have to be too close to the edge), but not so far that it routinely registers false positives (e.g., detects edge points that are part of one or more other edges). In some implementations, the value of the edge distance threshold can be user adjustable. For example, a user can adjust the value of the edge distance threshold depending on the density of detected edges in the image.

In some examples, as the search steps from search point to search point, the image-to-edge mapping engine 204 can also analyze points that are adjacent to the search points, such as points to the left and right of a search point and/or points above and below the search point. In one illustrative example, if the vector being searched around is in a mostly vertical direction (e.g., greater than 45 degrees or less than −45 degrees relative to a horizontal line), like the vector 526 in FIG. 5A, the search process can analyze points to the left and right of a search point (and not the points above and below the search point). In another illustrative example, if the vector being searched around is in a mostly horizontal direction (e.g., between 0 and 45 degrees or between 0 and −45 degrees relative to a horizontal line), like the vector 524 in FIG. 5A, the search process can analyze points above and below a search point (and not the points to the left and right of the search point). In some examples, the points above and below and the points to the left and to the right of a search point can be analyzed to determine whether they are edge points in the edge map 510. Searching the adjacent pixels avoids a situation of the line along the search path falling between cracks of a detected edge.

For example, the search process can analyze the search point 527 at location (5, 1) in the portion 511 of the edge map to determine if the search point 527 is an edge point. Points above and below the search point 527 (shown as being connected to the search point 527 by dotted lines) are also analyzed to determine if either or both are edge points. As shown, the search point 527 and the points above and below the search point 527 are non-edge points (they are not edge points). The image-to-edge mapping engine 204 can continue the search process by analyzing other search points, and in some cases one or more adjacent points, until an edge point is found. For example, the search process can next analyze the search point 528 at location (6, 2) in the portion 511 of the edge map to determine if the search point 528 is an edge point. Points to the left and the right of the search point 528 (shown as being connected to the search point 528 by dotted lines), including point 530, are also analyzed to determine if either or both are edge points. As shown, the search point 528 and the point to the left of the search point 528 are non-edge points (they are not edge points), while the point 530 to the right of the search point 528 is an edge point (as indicated by the large circle).

Returning to FIG. 4, once an edge point (e.g., the edge point 530) is determined during the search process for the current input position (e.g., the current input position 522), the process 400 can perform a validation check at block 408 (e.g., implemented by the edge validation engine 206) to determine if the edge point is connected to a previous edge point (e.g., edge point 521) determined for the tracing operation. For example, the validation check can be performed on the edge point 530 to determine if the edge point 530 is connected to the previous edge point 521 determined for the tracing operation.

The validation check process is illustrated by the diagram of FIG. 5B. Referring to FIG. 5B, the validation check can be performed by the edge validation engine 206 to determine if the two edge points 521 and 530 are connected. A direction vector can be determined from the previously determined edge point 521 to the current edge point 530 determined for the current input position 522. The previous edge point 521 can be denoted as P0 and the current edge point 530 can be denoted as P1. In some examples, the angle of the vector can be rounded to one of one of eight directions (e.g., multiples of 45 degrees or π/4). For instance, if the angle of the vector 532 from the previous edge point 521 to the current edge point 530 is −42 degrees relative to a horizontal line, the angle of the vector 532 can be rounded to −45 degrees.

The edge validation engine 206 can perform the validation check by stepping point-by-point from P0 towards P1 along the direction of the vector to determine if there is an edge point at each step. For example, the validation check can continue stepping point-by-point until P1 is reached and edge points have been found at each step, in which case the edge point P1 is validated as being connected to the same edge as the previous edge point P0. In another example, the validation check can continue until a point is encountered along the path from P0 to P1 that is not an edge point. In such an example, the validation check can determine that the edge point P1 is not connected to the same edge as the previous edge point P0.

In another example, the validation check can continue until a point is reached that is separated from the current edge point P1 by a distance equal to or greater than a validation distance threshold. In such an example, the validation check determines the current edge point P1 is not connected to the same edge as the previous edge point P0. In some cases, the validation distance threshold can be double the distance between P0 and P1 (denoted as $D_{thres}=2\times\|P1-P0\|$). In one illustrative example, the previous edge point P0 is on a horizontal line, and the current edge point P1 is on a disconnected line 10 pixels below and 10 pixels to the right of the previous edge point P0. In such an example, the validation check process will continue to step horizontally to the right past P0. If the horizontal line is long, the validation check process can continue stepping horizontally indefinitely. The validation distance threshold can limit the distance the validation check process will step (e.g., based on the distance threshold of $D_{thres}=2\times\|P1-P0\|$).

Referring to FIG. 5B, the edge validation engine 206 can step point-by-point along the vector 532 from the edge point 521 to the edge point 530. As shown, the only point along the path between the edge point 521 to the edge point 530 is the edge point 534. Because the edge point 530 is connected to the edge point 521 only by other edge points, the edge validation engine 206 determines that the edge point 530 is a valid edge point.

In some examples, the validation check can allow one or more points between the current edge point P1 and the previous edge point P0 to be a non-edge point. For instance, a threshold number of non-edge points can be allowed by the validation check. The threshold number of non-edge points can be set to any number, such as 0, 1, 2, or other number. If the threshold number is set to 0, then the validation check will consider a current edge point P1 as not being valid if any point along the path between the current edge point P1 and the previous edge point P0 is a non-edge point.

If the edge point P1 is found to be connected via edge points to the previous point, then the edge point P1 is validated at block 408 and accepted as the next edge point approximating the path associated with the tracing operation. For example, at block 410, the process 400 includes saving a validated edge point for use in generating one or more vector drawing segments for the tracing operation. The process 400 can then analyze a next input position (which will become the current input position once the process 400 begins for that input position). If, during the search, no edge points are found that are connected to the previous point P0, the point on the edge closest to (but not connected to) the input position (e.g., a cursor point) is taken as the next edge point approximating the path associated with the tracing operation. By using a closest point that is not connected to a previous point P0 when no connected points can be found, small gaps in the edge map can be compensated for as the edge is traced by the user during the tracing operation. In some cases, the previous point P0 and the closest point to the input position can be connected with a straight line. In some cases, a new curve can be started.

If an edge point is not validated at block 408 and is thus determined not to be connected to a previous edge point P0, the process 400 continues the search process by analyzing other search points around the current input position (e.g., the input position 522 in FIG. 5) to determine if any further edge points can be found. If the search does not find an edge pixel, then the process 400 stops saving edge points until an input position (e.g., the cursor location) is detected as being close enough to a detected edge point.

At block 411, the process 400 ends. The process 400 can end in response to any termination criteria, such as in response to a user request (e.g., selecting an option indicating the user is finished tracing an edge, such as releasing a mouse button, releasing a touch input using a finger or pointing device, or other input). The process 400 can stop accumulating edge points when the process 400 ends.

In some examples, if the tracing process hits a gap in an edge (e.g., a non-edge pixel is found between two edge pixels), the image conversion system 200 can decide how to bridge the gap. For example, the image conversion system 200 can draw a straight line between the two edge pixels, start a new curve, or other operation, depending on a user-provided setting, a system setting, or other setting or criteria.

An illustrative example of using the image conversion system 200 and techniques described above will now be described with respect to FIG. 6A-FIG. 6E. For instance, FIG. 6A-6E provide an example of transforming raster elements in raster images to vector drawing segments in accordance with one or more examples described herein. FIG. 6A illustrates a client device 640 displaying a graphical user interface 642. In some implementations, an image editing system provides the graphical user interface 642 for display on the client device 640. In such implementations, the image conversion system 200 operates within the image editing system. In some implementations, the image conversion system 200 provides the graphical user interface 642. An example image editing system is described below with respect to FIG. 8 and FIG. 9.

As shown in FIG. 6A, the graphical user interface 642 includes a raster image 644 of a raster element 646 (e.g., a mug with a logo). The raster image 644 represents an imported image provided by a user, such as a raster image captured by a digital camera, a raster image downloaded from the Internet, or the like. While not shown, the raster image 644 can include multiple raster elements (e.g., objects or subjects). The raster element 646 within the raster image 644 includes many edges. As noted above, the edge detection engine 202 can determine an edge in a raster image based on a change in image brightness, shading, color, or other characteristic of the raster image. In many raster images, raster elements include edges distinguishing the raster element (e.g., a foreground object) from the background of the image or from other raster elements depicted in the image. Raster elements can also include lines, shapes, colors, patterns, and/or features that create edges. For example, as shown in FIG. 6A, the raster element 646 in the raster image 644 includes multiple edges including exterior edges and interior edges.

In some examples, the image conversion system 200 can transform one or more edges selected by a user into a vector drawing segment based on user interactions. As described above, a user interaction can include a single interaction, or combination of interactions, received from a user by way of one or more input devices (e.g., a mouse, a pointer device, a touch interface such as a touchscreen, a gesture input device, among others). The image conversion system 200 can detect user interactions with the graphical user interface 642 based on cursor movements and selections (e.g., "clicks") provided by the user (or other user input, such as touch, drag, and/or release events on a touchscreen).

As shown in FIG. 6A, the graphical user interface 642 includes a cursor 648 (e.g., a digital mouse pointer) indicating the position or location of a user interaction. The cursor 648 corresponds to an input position of the one or more input positions 203 of FIG. 2. For ease of explanation, a cursor is displayed within a graphical user interface in many of the figures. However, the image conversion system 200 can perform the actions described herein without displaying a cursor. For example, rather than using cursor movements and selections to detect user interactions, the image conversion system 200 can use other inputs (e.g., touchscreen inputs, gesture inputs, voice inputs, or other inputs) to detect user interactions. In some cases, a device might not display a cursor, such as a mobile device (e.g., a mobile phone), a tablet device, or other device. Such a device can use other types of inputs (e.g., touchscreen inputs, etc.). Thus, while a cursor is shown and described herein with respect to detecting user interactions, the image conversion system 200 can detect user interactions through additional or alternative methods.

The image conversion system 200 can detect movements of the cursor 648 within the graphical user interface 642 (e.g., receives cursor positions from an operating system on the computing device implementing the image conversion system 200) and can detect selections (e.g., "clicks") of the cursor 648. For example, as shown in FIG. 6A, the image conversion system 200 detects the user moving the cursor 648 near the outside edge of the logo on the raster element 646. In some cases, the image conversion system 200 can use the position of the cursor 648 to detect an edge of the raster element 646 the user desires to vectorize (e.g., transform into a vector drawing segment). For example, as described above with respect to FIG. 4, FIG. 5A, and FIG. 5B, a neighborhood of points around the input position (corresponding to the location of the cursor 648) can be searched to find an edge point in the edge map and a corresponding edge pixel in the raster image.

Figure 6B:
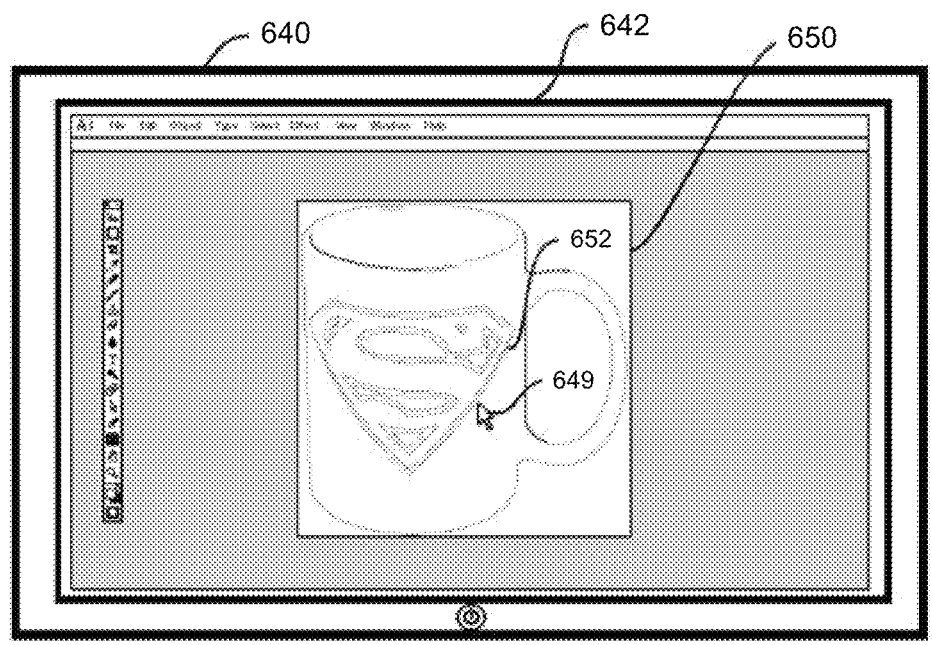

As described above, prior to transforming a selected edge into a vector drawing segment, the image conversion system 200 can detect one or more edges of the raster element 646. For example, the image conversion system 200 can first determine which pixels in the raster image 644 make up an edge and can generate an edge map. FIG. 6B shows an example of an edge map 650 of the raster image 644 generated by the edge detection engine 202 of the image conversion system 200. As noted above, in some cases, each detected edge in the edge map 650 is represented by a single-pixel-wide line. In some instances, the image conversion system 200 represents a thicker line or shape in the raster image 644 (e.g., a line or shape that is at least three-pixels wide) using multiple single-pixel-wide lines. In some cases, when a thicker line or shape appears in the raster image 644, the image conversion system 200 can identify multiple edges associated with the line or shape (e.g., a shape with an inner edge and outer edge or a line with two outer edges). For example, because the border around the logo in the raster image 644 is thicker, the image conversion system 200 can detect an outer single-pixel-wide line and an inner single-pixel-wide line in the corresponding edge map 650.

In some implementations, when performing edge detection of edges in the raster image 644, the image conversion system 200 can use various edge detection parameters and/or pixel densities of available pixels to detect more or fewer edges. For example, in some cases, the image conversion system 200 can modify one or more edge detection parameters to increase the number of edges detected in the raster image 644 (e.g., to detect weaker or lower-contrasting edges). In some cases, the image conversion system 200 can modify one or more edge detection parameters to decrease the number of edges detected in the raster image 644 (e.g., to only detect stronger or higher-contrasting edges), to reduce clutter in highly textured raster images.

As described above, the image conversion system 200 can generate an edge map 650 to match the resolution of the raster image 644. By providing an edge map with the same resolution as a raster image, the conversion system 200 easily maps coordinates and pixels between the two bitmaps (the raster image 644 and the edge map 650), as described below. In some examples, the image conversion system 200 can generates the edge map 650 to have a lower or higher resolution than the raster image 644.

In some cases, as noted above, the image conversion system 200 can perform pre-processing on the raster image 644 to improve edge detection, such as by applying one or more filters that minimize color, reduce noise, and/or increase the contrast of the raster image 644. For instance, in some implementations, the image conversion system 200 can apply a bilateral filter to reduce noise while retaining edge sharpness of the raster image 644 before performing edge detection and generating the edge map 650.

In some implementations, as described previously, a user can select an option to transform one or more edges of the raster image 644 into a vector drawing (e.g., transform the raster element 646 in the raster image 644 into a vector drawing segment). For instance, a user can select an edge tracing option that indicates the start of a tracing operation to trace an edge of the raster element 646 in the raster image 201. The edge map 650 can be generated by the image conversion system 200 upon receiving an indication that the user has selected the option and requested the edges of the raster image 644 to be transformed into a vector drawing. In some cases, the image conversion system 200 can automatically generate the edge map 650, for example, upon loading the raster image 644 or detecting a selection of a particular image editing tool.

While FIG. 6B shows the edge map 650 within the graphical user interface 642, in some cases, the edge map 650 may not be displayed within the graphical user interface 642. For example, the image conversion system 200 can generate the edge map 650 as a raster bitmap image for use in determining edge pixels in the raster image 644, and not for display to a user. In some implementations, the image conversion system 200 can provide the edge map 650 for display in connection with the raster image 644. For example, the image conversion system 200 can provide the edge map 650 as a layer that can be hidden or revealed within the graphical user interface 642 based on user input. In another example, the image conversion system 200 can provide the edge map 650 for display as an overlay to the raster image 644.

As described above, the image conversion system 200 can detect a user interaction, such as the user moving the cursor 648 over the raster image 644. Based on the position of the cursor 648 with respect to the raster image 644, the image conversion system 200 can identify a detected edge within the edge map 650. For example, the image conversion system 200 can map the input position of the cursor 648 from the raster image 644 to the edge map 650 to identify a detected edge point corresponding to the position of the cursor 648. Details regarding mapping a location or coordinate of the input position to a point of an edge map are described above. Using the mapped cursor 649 (e.g., the mapped coordinates), the image conversion system 200 can determine a detected edge point within the edge map 650. For instance, in response to detecting the user interaction from the user moving the cursor 648 over the raster image 644, the image conversion system 200 can identify the input position of the mapped cursor 649 within the edge map 650. Based on the input position of the mapped cursor 649, the image conversion system 200 can detect an edge pixel on the edge 652 based on the search process described above with respect to FIG. 4-FIG. 5B. For instance, the search process can be used to determine an edge point in the edge map 650, and the edge point can be mapped to an edge pixel in the raster image 644. As noted above, the search process accurately detects an edge that a user is tracing, even when the path associated with the tracing operation is not exactly along the edge. By performing the search process, the image conversion system 200 allows a user to approximately trace along an edge, and continues to generate an exact track along the edge. Such a technique leads to less effort and time for a user to generate a vector drawing, as compared to systems that require a user to carefully follow an edge on a pixel-by-pixel basis. In some cases, the image conversion system 200 can perform the validation check described above to validate whether the detected edge pixel is connected to a previously determined edge pixel for the edge 652.

Figure 6C:
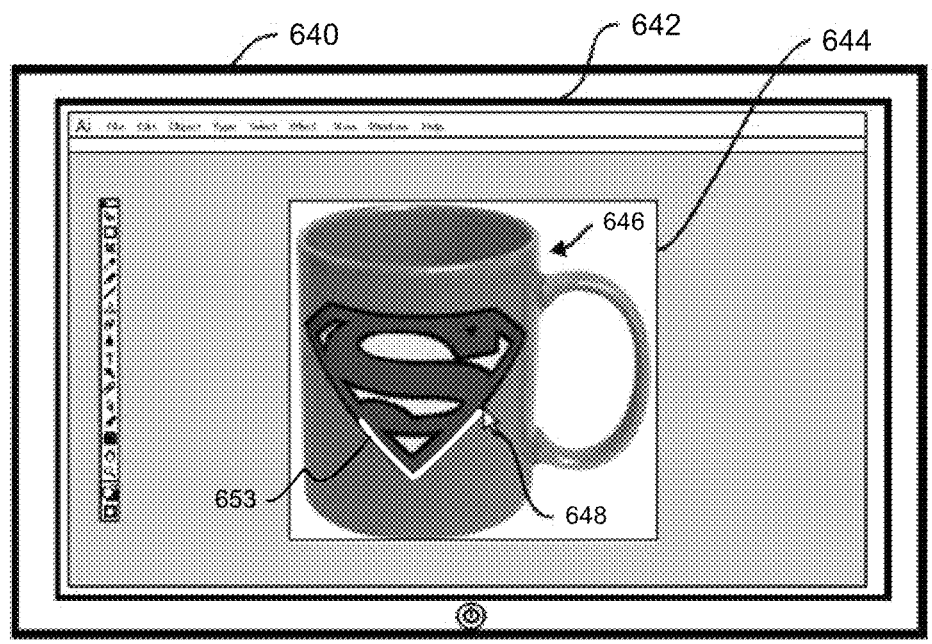

Upon identifying a detected edge pixel, the image conversion system 200 can begin to generate a pixel line for the detected edge 652. For example, as shown in FIG. 6C, the detected and in some cases validated edge pixels of the edge 652 can be highlighted or otherwise emphasized (e.g., using one or more colors, weights, thicknesses, and/or patterns to contrast the pixel line 653 with the raster image 644) for display over the edge 652 as a pixel line 653 in the raster image 644. The pixel line 653 can be displayed over the raster image 644 to show the user the path of the tracing operation being performed by the user. In some cases, when the image conversion system 200 generates the pixel line 653, the image conversion system 200 stores the (x, y) pixel coordinates of each edge pixel detected along the edge 652, which is used to define the pixel line 653.

In some implementations, the image conversion system 200 can generate the edge map 650, identify the edge pixels of the edge 652 in the edge map 650 based on the user interaction, generate the pixel line 653, and display the pixel line 653 in real-time or near real time as a user interacts (e.g., moves the cursor 648) with the user interface 642. Further, as described previously, the image conversion system 200 may not display the edge map 650 to a user. In such cases, from the perspective of the user, as the user moves the cursor 648 to trace an edge of the raster image 644, the image conversion system 200 near-instantaneously displays the pixel line 653 over the edge near the cursor 648.

Figure 6D:
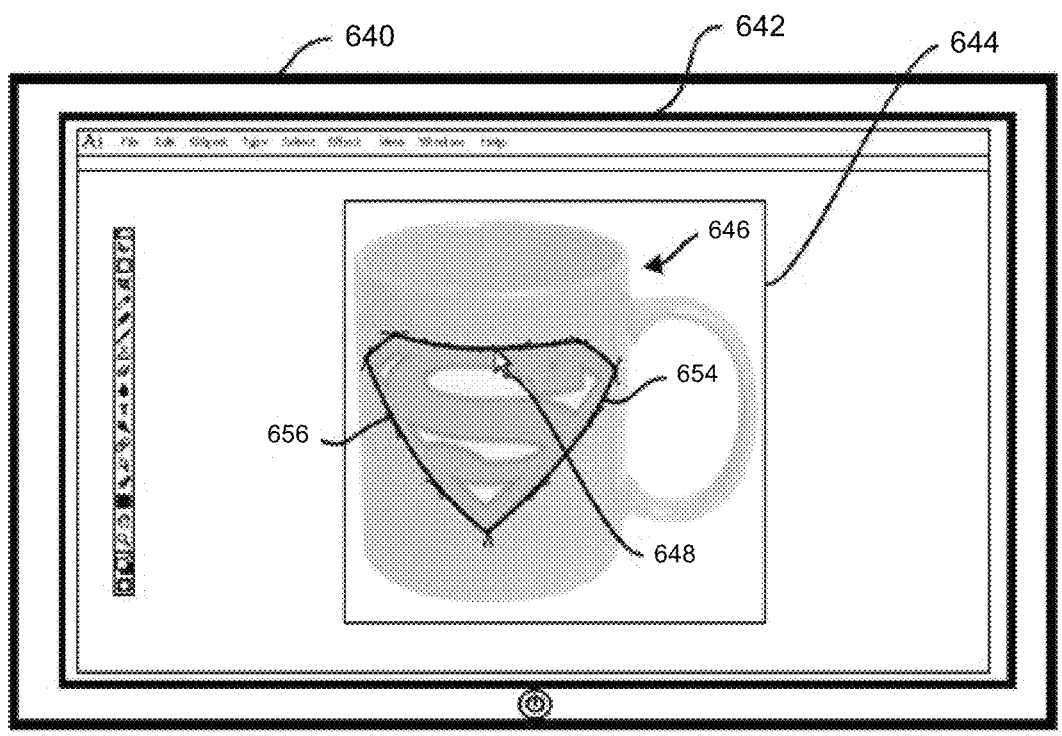

In some examples, the image conversion system 200 renders the pixel line 653 as edge pixels are detected without vectorizing the pixel line 653. For instance, the image conversion system 200 can wait to transform the pixel line 653 into a vector drawing segment, such as a Bézier curve, until the user provides an indication to perform the conversion or until the complete edge 652 is traced by the user. For example, the image conversion system 200 can detect a user interaction that indicates (e.g., clicks, taps, holds down, or presses) the user is ready for a vector drawing segment to be generated for edge 652. Referring to FIG. 6D as an illustrative example, the image conversion system 200 can detect a user interaction indicating the user wants the edge 652 to be transformed into a vector drawing segment. In response, the image conversion system 200 generates a vector drawing segment 654 for the edge 652, as shown in FIG. 6D. The vector drawing segment 654 is shown in the raster image 644 in place of the edge 652. In some implementations, the image conversion system 200 can provide the vector drawing segment 654 in a separate overlay (e.g., layer or a vector drawing layer) that includes each of the vector drawing segments transformed from detected edge pixels of an edge. In some examples, the image conversion system 200 can render the pixel line 653 as edge pixels are detected and can vectorize the pixel line 653 as it is rendered.

In some implementations, as described above, the image conversion system 200 can transform the detected edge pixels into a vector drawing segment by fitting a Bézier curve to the edge pixels. For example, the image conversion system 200 can use the coordinates of the edge pixels to fit a Bézier curve to the corresponding edge. In some cases, the image conversion system 200 can fit multiple Bézier curves to a line of edge pixels to ensure a smooth, accurate, and close fit. As shown in FIG. 6D, vector controls 656 (e.g., control lines and control points) are displayed in connection with the vector drawing segment 654. The vector controls 656 can be modified by a user using an input device. In some cases, the image conversion system 200 provides vector controls 656 to allow a user to further modify the vector drawing segment 654 to suit a user's preferences (e.g., to better align the vector drawing segment with the edge 652). In examples where a vector drawing segment 654 is made up of multiple Bézier curves, the image conversion system 200 can provide vector controls 656 for each Bézier curve. In some implementations, the image conversion system 200 can hide the vector controls 656 from display the graphical user interface 642 until the user selects the vector drawing segment 654 and/or selects an option to show the vector controls 656.

Figure 6E:
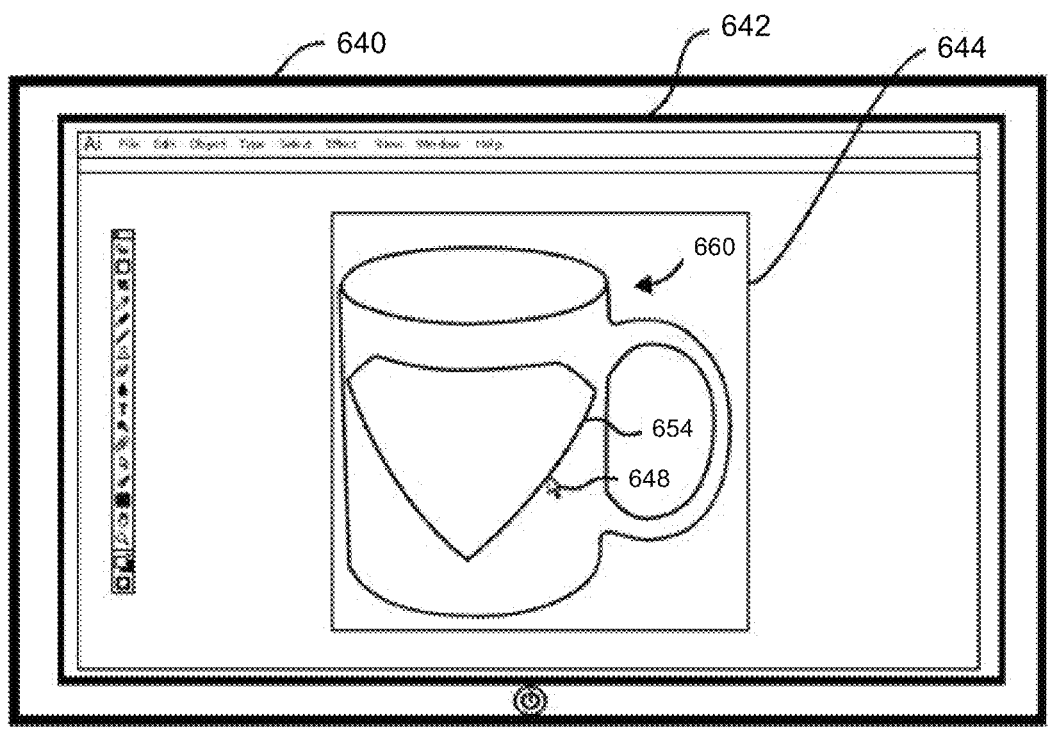

Upon rendering the vector drawing segment 654, the image conversion system 200 can display a vector drawing on the graphical user interface 642. For instance, the image conversion system 200 can provides a selectable option for the user to remove the raster image 644 and/or display a vector drawing of the vector drawing segment 654 in a separate image. FIG. 6E shows the vector drawing 660 that includes the vector drawing segment 654. In addition, the vector drawing 660 includes additional vector drawing segments (e.g., pixel lines corresponding to the outer edges of the mug) traced by the user and transformed by the image conversion system 200.

As described above, the image conversion system 200 provides many advantages over conventional systems. For instance, by performing the search process for searching for edge points and the validation check process described above, the image conversion system 200 provides an efficient and user-friendly mechanism for creating vector drawings from raster images. For instance, using such a system, a user is in direct control of the vector drawing creation process, allowing the user to define the edges they are interested in to be created as vectors in the vector drawing. The tracing process using such a system is intuitive and familiar, yet it does not require absolute precision to track the edges exactly. For example, by searching the neighborhood around an input position (e.g., along the search patterns defined by the vectors 524 and 526 in FIG. 5A) edge points can be found that belong to the edge the user is tracing using the tracing operation. The resulting edges are generated as smooth, precise Bézier curves, and easily used with other artwork and applications.

The image conversion system 200 also provides advantages over conventional systems by not vectorizing a pixel line until user input is received to transform a pixel line into a vector drawing segment. For example, unlike conventional systems that perform batch conversions, only edges desired by the user are transformed, providing flexibility not achievable by conventional systems. Further, the selective conversion not only simplifies and reduces image editing time to a user through increased flexibility, the selective conversion also reduces computational steps by not transforming undesirable edges/pixel lines that the user must manually remove. Indeed, the image conversion system 200 achieves greater computational efficiency over conventional systems by transforming fewer edges. Such a solution also reduces memory usage.

An example of a process performed using the techniques described herein will now be described. FIG. 7 is a flowchart illustrating an example of a process 700 for generating a vector drawing from a raster image. At block 702, the process 700 includes obtaining an edge map for a raster image. The raster image includes a plurality of pixels. The edge map indicates one or more edge points of one or more edges in the raster image.

At block 704, the process 700 includes determining a point of the edge map corresponding to an input position. The input position is based on a user interaction with a graphical user interface displaying the raster image.

At block 706, the process 700 includes determining an edge point of the edge map corresponding to the input position. The edge point is determined from a neighborhood of one or more points associated with the point of the edge map. In some examples, the search process described above with respect to FIG. 5A can be performed to determine the edge point of the edge map. In some cases, the edge point is a closest edge point to the determined point of the edge map (e.g., determined using the search process). In some examples, the edge point is a closest edge point to the determined point of the edge map that is part of a same edge as a previous edge point. The previous edge point is determined prior to the edge point based on a previous point of the edge map determined for a previous input position. For instance, referring to FIG. 5A as an illustrative example, the previous edge point 521 is determined prior to the current edge point 530.

In some examples, the process 700 can include determining the neighborhood of the one or more points associated with the point of the edge map based on a previous point of the edge map determined for a previous input position. The previous point is determined prior to the point of the edge map. For instance, referring to FIG. 5A as an illustrative example, the previous point can correspond to the previous input position 520 occurring prior to the current input position 522. In some cases, the process 700 can include determining a line extending from the previous point to the point of the edge map, and determining the neighborhood of the one or more points based on the line. Using FIG. 5A as an illustrative example, the line can include the vector 524 or the vector 526. In some cases, the process 700 can include determining a search point in the edge map through which the line intersects. Referring to FIG. 5A, the search point can include search point 528. The process 700 can include determining the neighborhood of the one or more points around the search point. Referring again to FIG. 5A, the neighborhood of points around the search point 528 include the circles shown as being connected to the search point 528 by dotted lines (to the right and to the left of the search point 528).

In some cases, the process 700 can include determining a first line extending from the previous point to the point of the edge map and determining a second line extending from the point of the edge map. The second line is determined relative to the first line. Using FIG. 5A as an illustrative example, the first line can include the vector 524, and the second line can include the vector 526, which is determined as being perpendicular to the vector 524. One of skill will appreciate that the second line can be determined relative to the first line using an angle other than 90 degrees. The process 700 can include determining the neighborhood of the one or more points based on the first line and the second line.

In some cases, the process 700 can include determining a search point in the edge map through which the first line or the second line intersects, and determining the neighborhood of the one or more points around the search point. Referring again to FIG. 5A, neighborhoods of points can be search around various search points, including the search point 527 and the search point 528.

In some examples, the process 700 can include determining the edge point is part of a same edge as a previous edge point. As noted above, the previous edge point is determined prior to the edge point based on a previous point of the edge map determined for a previous input position. The edge point can be determined as being part of the same edge as the previous edge point using the validation check process described above. In some cases, the process 700 can include determining each point of the edge map between the previous edge point and the edge point is part of an edge of the edge map, and determining the edge point is part of the same edge as the previous edge point based on each point of the edge map between the previous edge point and the edge point being part of an edge of the edge map.

At block 708, the process 700 includes generating, using a plurality of edge points of the edge map, a vector drawing segment for a vector drawing representing the raster image. The plurality of edge points including the determined edge point and being based on the user interaction with the graphical user interface.

In some examples, the process 700 can include determining a non-edge point between a first edge point and a second edge point. The process 700 can connect the first edge point to the second edge point using a line based on determining the non-edge point between the first edge point and the second edge point. In some examples, the process 700 can include generating a new line segment based on determining the non-edge point between the first edge point and the second edge point.

In some examples, the process 700 can include: obtaining the raster image; and generating the edge map by detecting the one or more edges in the raster image.

Figure 10:
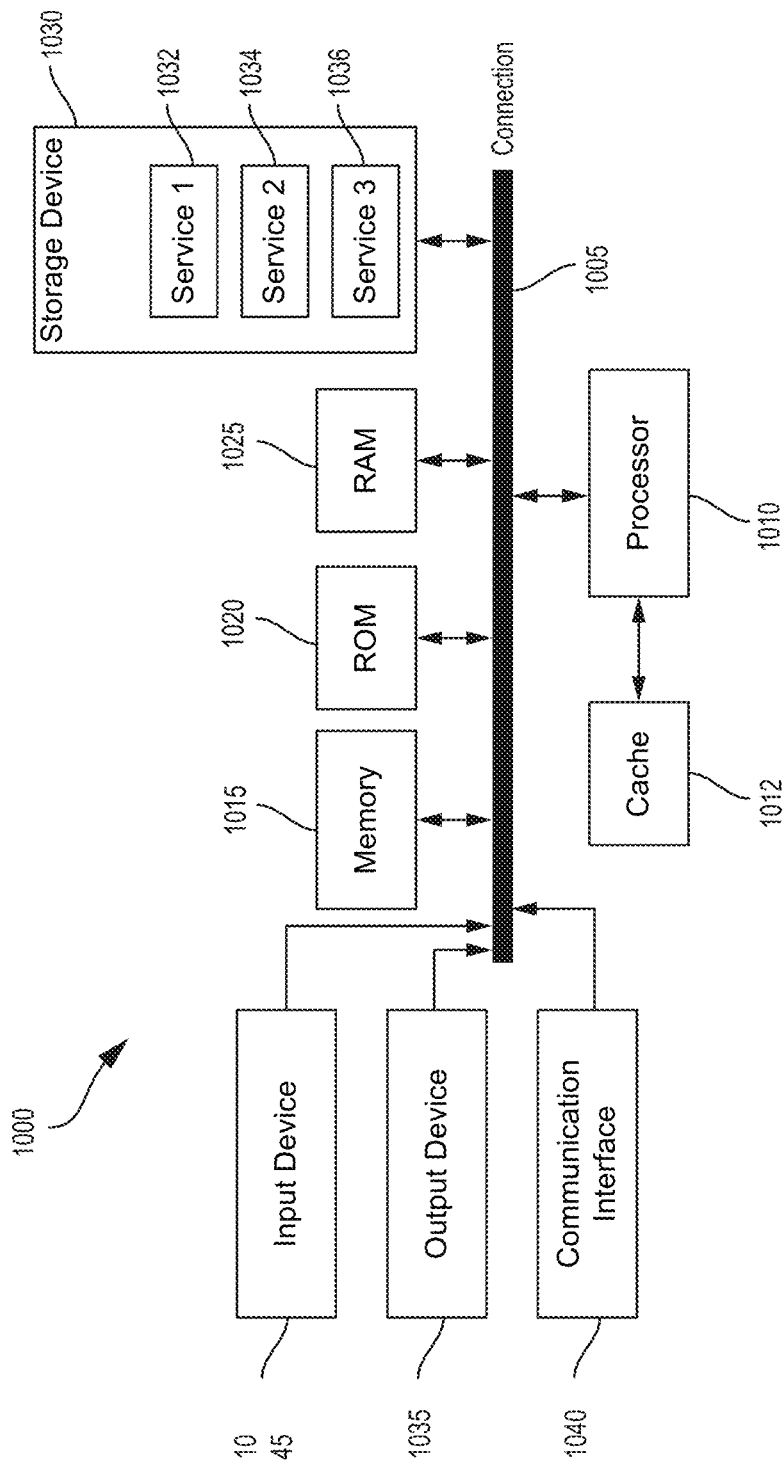
FIG. 10 is an example computing device architecture of an example computing device that can implement the various techniques described herein.

In some examples, the process 700 may be performed by a computing device or apparatus, such as a computing device having the computing device architecture 1000 shown in FIG. 10. In one example, the process 700 can be performed by a computing device with the computing device architecture 1000 implementing the image conversion system 200. The computing device can include any suitable device, such as a mobile device (e.g., a mobile phone), a wearable device, a server (e.g., in a software as a service (SaaS) system or other server-based system), and/or any other computing device with the resource capabilities to perform the process 700. In some cases, the computing device or apparatus may include various components, such as an input device, an edge detection engine, an input-to-edge mapping engine, an edge validation engine, a vector drawing generation engine, one or more output devices, one or more processors, one or more microprocessors, one or more microcomputers, and/or other component that is configured to carry out the steps of process 700. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Process 700 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
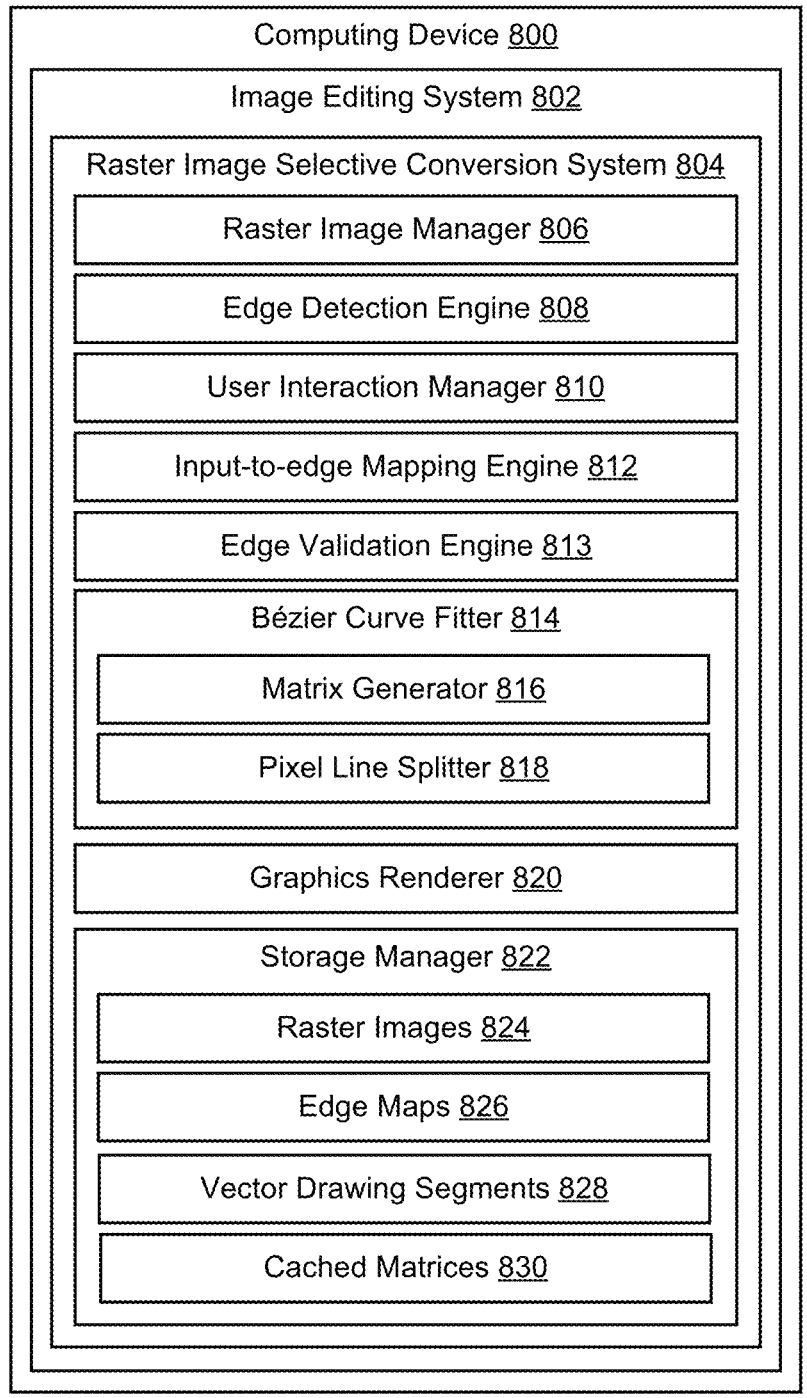
FIG. 8 is a schematic diagram illustrating components of a computing device that includes an image editing system, in accordance with some examples provided herein.

FIG. 8 is a diagram illustrating components of a computing device 800 that includes an image editing system 802 and a raster image conversion system 804 (an example implementation of the image conversion system 200 described above). In some implementations, some or all the components of the raster image conversion system 804 (or simply "image conversion system 804") are implemented separately from the image editing system 802. In some cases, the computing device 800 can include a variety of different devices. For example, in some examples, some or all the components of the image conversion system 804 are implemented on a client device and/or a server device.

As shown, the image conversion system 804 is implemented by a computing device 800 within an image editing system 802. In some cases, the computing device 800 can include a client device, such as a mobile device (e.g., a mobile telephone, a smartphone, etc.), a laptop computer, a tablet computer, a desktop computer, or other client device. In some cases, the computing device 800 is non-client device, such as a server or multiple servers (e.g., in a cloud-computing environment). Additional details regarding components of a computing device are discussed below with respect to the computing device 1000 of FIG. 10, some or all of which can be part of the computing device 800.

The image editing system 802, in general, facilitates the creation, modification, sharing, and/or deletion of digital images within one or more software applications. For example, the image editing system 802 provides a variety of tools on the computing device 800 related to image creating and editing (e.g., image drawing, editing, and vectorization). In addition, the image editing system 802 can access locally or remotely stored repositories of raster images. In some implementations, the image editing system 802 can be located separately from the computing device 800 (e.g., on a server device) and can communicate with the image conversion system 804 over any suitable wired or wireless network and/or connection.

The image editing system 802 can operate in connection with one or more applications to facilitate the vectorization of raster images on the computing device 800. For example, in one or more examples, the image editing system 802 includes multiple applications, functions, and operations relating to graphical content, such as an application suite, a web-based application, and/or system operation on the computing device 800.

As shown, the image conversion system 804 in FIG. 8 includes various components for performing the processes and features described herein. For example, the image conversion system 804 includes a raster image manager 806, an edge detection engine 808, a user interaction manager 810, an input-to-edge mapping engine 812, an edge validation engine 813, a Bézier curve fitter 814, a graphics renderer 820, and storage manager 822. Each of these components is further described below.

The raster image manager 806 can facilitate identifying, accessing, receiving, obtaining, generating, importing, exporting, copying, modifying, removing, and/or organizing raster images. In one or more examples, the raster image manager 806 operates in connection with the image editing system 802 to access and load raster images. Further, as shown, the raster image manager 806 communicates with the storage manager 822 to store and/or access raster images 824.

Similar to the edge detection engine 202 described above with respect to FIG. 2, the edge detection engine 808 can create, generate, and/or detect an edge map for a raster image or a portion thereof. In some examples, the edge detection engine 808 generates an edge map by detecting edges in the raster image based on edge detection parameters and/or pixel sampling densities where the edges are one pixel wide, as previously explained. In some implementations, the edge detection engine 808 can use Canny edge detection to detect edges in a raster image. Further, the edge detection engine 808 can communicate with the storage manager 822 to store and/or access edge maps 826.

The user interaction manager 810 can detect, identify, receive, recognize, and/or interpret interactions by a user. The user interaction manager 810 can detect user interactions within a graphical user interface, as described previously. As mentioned above, user interactions include movements, clicks, drags, selections, or deselections with a cursor, touch input, voice input, gesture input, and/or other suitable input.

In some examples, the user interaction manager 810 communicates with the edge detection engine 808 by providing coordinates of a user interaction (e.g., an input position) to the edge detection engine 808. For example, as a user moves a cursor over a raster image within a graphical user interface, the user interaction manager 810 provides the coordinates to the edge detection engine 808, as previously described. Similarly, in some cases, when the user interaction manager 810 detects a user interaction, such as the user selecting an edge tracing option, the user interaction manager 810 can provide an indication of the edge tracing operation to the input-to-edge mapping engine 812.

The input-to-edge mapping engine 812 receives an input position (e.g., coordinates) of a user interaction with a raster image and identifies an edge point corresponding to the input position, as previously explained. The input-to-edge mapping engine 812 can perform the search process to detect edge points in the edge map generated by the edge detection engine 808, as described previously.

The edge validation engine 813 receives a detected edge point from the input-to-edge mapping engine 812 and can perform the validation check described above to determine whether a current edge point is connected to a previously detected edge point for an edge.

The Bézier curve fitter 814 includes a matrix generator 816 and a pixel line splitter 818. In general, the Bézier curve fitter 814 can generate a vector drawing segment by fitting one or more Bézier curves to a pixel line of an edge, as described previously. For example, in some embodiments, the Bézier curve fitter 814 can use a Bézier curve fitting algorithm to fit a Bézier curve to a pixel line. As shown, the Bézier curve fitter 814 communicates with the storage manager 822 to store and access the vector drawing segment generated for a pixel line.

The matrix generator 816 can generate and cache matrices of Bézier coefficients, used by the Bézier curve fitter 814 to fit a Bézier curve to a pixel line. As described above, a Bézier coefficient matrix corresponds to a particular number of pixels in a pixel line, and the Bézier curve fitter 814 reuses the same Bézier coefficients matrix multiple times for pixel lines having the same number of pixels. As shown, the matrix generator 816 communicates with the storage manager 822 to store and access the cached matrices 830.

In some embodiments, the pixel line splitter 818 can detect when a Bézier curve does not closely fit a pixel line. For example, the pixel line splitter 818 can determine whether the distance between a pixel on the pixel line and an initially fit Bézier curve exceeds an error threshold. When the pixel line splitter 818 detects the error threshold is exceeded, the pixel line splitter 818 splits the pixel line into two segments, and refits Bézier curves to each of the pixel lines.

The graphics renderer 820 provides and/or renders one or more graphical user interfaces that can display raster images. In some cases, the graphics renderer 820 provides and/or renders overlays including pixel lines and/or vector drawing segments 828. For example, the graphics renderer 820 can provide and/or renders an image layer of a vector drawing including one or more vector drawing segments 828 transformed from edges in a raster image, as described above.

The components 806-830 of the image conversion system 804 includes software, hardware, or both. For example, the components 806-830 include one or more instructions stored on a computer-readable storage medium and executable by processors of one or more computing devices, such as a client device or server device. When executed by the one or more processors, the computer-executable instructions of the image conversion system 804 can cause the computing device(s) to perform the feature learning methods described herein. Alternatively, the components 806-830 can include hardware, such as a special-purpose processing device to perform a certain function or group of functions. Alternatively, the components 806-830 of the image conversion system 804 can include a combination of computer-executable instructions and hardware.

Furthermore, the components 806-830 of the image conversion system 804 are, for example, implemented as one or more operating systems, as one or more stand-alone applications, as one or more modules of an application, as one or more plug-ins, as one or more library functions or functions called by other applications, and/or as a cloud-computing model. Thus, the components 806-830 can be implemented as a stand-alone application, such as a desktop or mobile application. Furthermore, the components 806-830 can be implemented as one or more web-based applications hosted on a remote server. The components 806-830 can also be implemented in a suite of mobile device applications or "apps." To illustrate, the components 806-830 can be implemented in an application, including but not limited to Adobe InDesign™, Adobe Illustrator™, Adobe Acrobat™ Adobe Photoshop™, Adobe After Effects™, among others.

Figure 9:
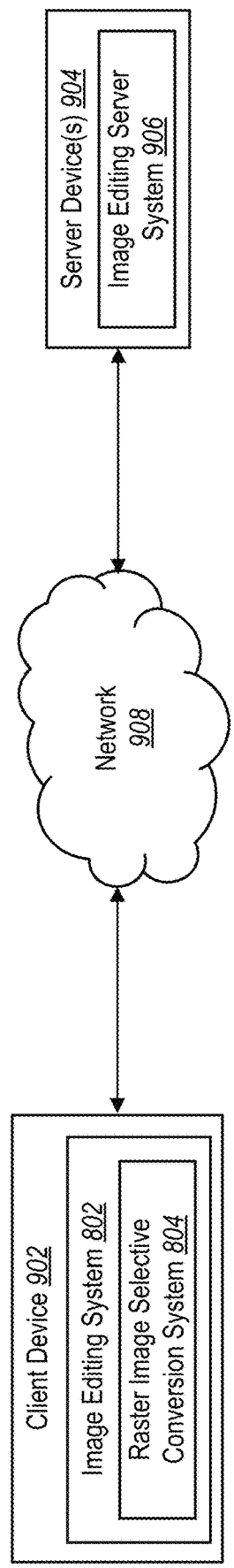
FIG. 9 is a schematic diagram illustrating an example of an environment in which the image conversion system can be implemented, in accordance with some examples provided herein.

FIG. 9 illustrates a schematic diagram of an environment 900 in which the image conversion system 200 and/or the image conversion system 804 can be implemented in accordance with one or more examples. In some examples, the environment 900 includes various computing devices including a client device 902 and one or more server devices 904. The environment 900 also includes a network 908. The network 908 may be any suitable network over which the computing devices can communicate, including any wired or wireless network.

As illustrated in FIG. 9, the environment 900 includes the client device 902. The client device 902 may comprise any computing device, such as the computing device described below in relation to FIG. 10. As shown, the client device includes the image editing system 802 and the image conversion system 804, which are described previously. For example, as described above, the image conversion system 804 can transform edges in a raster image into vector drawing segments 828 based on user interactions and user selections. Further, the image conversion system 804 can perform a search process to generate detect edge points corresponding to a tracing operation performed by a user using an input device, which the image conversion system 804 uses to transform or convert one or more edges in the raster image into vector drawing segments 828, as explained earlier.

In addition, the environment 900 includes the one or more server devices 904, which may comprise any computing device, such as one or more of the computing devices described below in relation to FIG. 10. The one or more server devices 904 can generate, store, receive, and transmit any type of data, including graphical content such as raster images, pixel lines, and/or vector drawing segments. As shown, the one or more server devices 904 includes an image editing server system 906 that communicates with the image editing system 1002 on the client device 902. For example, the image editing server system 906 can transmit graphical content to the client device 902, which enables the client device 902 to render pixel lines and/or vector drawing segments within a graphical user interface of the client device 902. Notably, while only a single server device is shown, the image editing server system 906 can be implemented across multiple server devices.

While not illustrated, in one or more embodiments, the one or more server devices 904 can also include all, or a portion of, the image conversion system 804, such as within the image editing server system 906. For example, when located in the one or more server devices 904, the image conversion system 804 can comprise an application running on the one or more server devices 904 or a portion of a software application that can be downloaded to the client device 902. For instance, the image conversion system 804 includes a web hosting application allowing the client device 902 to interact with content from the image editing server system 906 hosted on the one or more server devices 904. In this manner, the one or more server devices 904 can generate a pixel line and/or a vector drawing segment based on user interaction within a graphical user interface provided to the client device 902.

Although FIG. 9 illustrates a particular arrangement of the one or more server devices 904, the client device 902, and the network 908, various additional arrangements are possible. For example, while FIG. 9 illustrates the one or more client device 902 communicating with the one or more server devices 904 via the network 908, in one or more embodiments a single client device may communicate directly with the one or more server devices 904, bypassing the network 908.

Similarly, although the environment 900 of FIG. 9 is depicted as having various components, the environment 900 may have additional or alternative components. For example, the image conversion system 804 can be implemented on multiple computing devices. In particular, the image conversion system 804 may be implemented in whole by the one or more server devices 904 or the image conversion system 804 may be implemented in whole by the client device 902. Alternatively, the image conversion system 804 may be implemented across multiple devices or components (e.g., utilizing the one or more server devices 904 and the one or more client device 902).

FIG. 10 illustrates an example computing device architecture 1000 of an example computing device which can implement the various techniques described herein. For example, the computing device architecture 1000 can implement the image conversion system 200 shown in FIG. 2. The components of computing device architecture 1000 are shown in electrical communication with each other using connection 1005, such as a bus. The example computing device architecture 1000 includes a processing unit (CPU or processor) 1010 and computing device connection 1005 that couples various computing device components including computing device memory 1015, such as read only memory (ROM) 1020 and random access memory (RAM) 1025, to processor 1010.

Computing device architecture 1000 can include a cache of high-speed memory connected directly with, in close proximity to, or integrated as part of processor 1010. Computing device architecture 1000 can copy data from memory 1015 and/or the storage device 1030 to cache 1012 for quick access by processor 1010. In this way, the cache can provide a performance boost that avoids processor 1010 delays while waiting for data. These and other modules can control or be configured to control processor 1010 to perform various actions. Other computing device memory 1015 may be available for use as well. Memory 1015 can include multiple different types of memory with different performance characteristics. Processor 1010 can include any general purpose processor and a hardware or software service, such as service 1 1032, service 2 1034, and service 3 1036 stored in storage device 1030, configured to control processor 1010 as well as a special-purpose processor where software instructions are incorporated into the processor design. Processor 1010 may be a self-contained system, containing multiple cores or processors, a bus, memory controller, cache, etc. A multi-core processor may be symmetric or asymmetric.

To enable user interaction with the computing device architecture 1000, input device 1045 can represent any number of input mechanisms, such as a microphone for speech, a touch-sensitive screen for gesture or graphical input, keyboard, mouse, motion input, speech and so forth. Output device 1035 can also be one or more of a number of output mechanisms known to those of skill in the art, such as a display, projector, television, speaker device, etc. In some instances, multimodal computing devices can enable a user to provide multiple types of input to communicate with computing device architecture 1000. Communications interface 1040 can generally govern and manage the user input and computing device output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof. Storage device 1030 can include services 1032, 1034, 1036 for controlling processor 1010. Other hardware or software modules are contemplated. Storage device 1030 can be connected to the computing device connection 1005. In one aspect, a hardware module that performs a particular function can include the software component stored in a computer-readable medium in connection with the necessary hardware components, such as processor 1010, connection 1005, output device 1035, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of generating a vector drawing from a raster image, comprising:
   obtaining an edge map for a raster image, the raster image including a plurality of pixels, and the edge map indicating one or more edge points of one or more edges in the raster image;
   determining a point of the edge map corresponding to an input position, the input position being based on a user interaction with a graphical user interface displaying the raster image;
   determining an edge point of the edge map corresponding to the input position, the edge point being determined from a neighborhood of one or more points associated with the point of the edge map; and
   generating, using a plurality of edge points of the edge map, a vector drawing segment for a vector drawing representing the raster image, the plurality of edge points including the determined edge point and being based on the user interaction with the graphical user interface.

2. The method of claim 1, wherein the edge point is a closest edge point to the determined point of the edge map.

3. The method of claim 1, wherein the edge point is a closest edge point to the determined point of the edge map that is part of a same edge as a previous edge point, the previous edge point being determined prior to the edge point based on a previous point of the edge map determined for a previous input position.

4. The method of claim 1, further comprising:
   determining the neighborhood of the one or more points associated with the point of the edge map based on a previous point of the edge map determined for a previous input position, the previous point being determined prior to the point of the edge map.

5. The method of claim 4, further comprising:
   determining a line extending from the previous point to the point of the edge map; and
   determining the neighborhood of the one or more points based on the line.

6. The method of claim 5, further comprising:
   determining a search point in the edge map through which the line intersects; and
   determining the neighborhood of the one or more points around the search point.

7. The method of claim 4, further comprising:
   determining a first line extending from the previous point to the point of the edge map;
   determining a second line extending from the point of the edge map, the second line being determined relative to the first line; and
   determining the neighborhood of the one or more points based on the first line and the second line.

8. The method of claim 7, further comprising:
   determining a search point in the edge map through which the first line or the second line intersects; and
   determining the neighborhood of the one or more points around the search point.

9. The method of claim 8, wherein the second line is determined as being perpendicular to the first line.

10. The method of claim 1, further comprising:
determining the edge point is part of a same edge as a previous edge point, the previous edge point being determined prior to the edge point based on a previous point of the edge map determined for a previous input position.

11. The method of claim 10, further comprising:
determining each point of the edge map between the previous edge point and the edge point is part of an edge of the edge map; and
determining the edge point is part of the same edge as the previous edge point based on each point of the edge map between the previous edge point and the edge point being part of an edge of the edge map.

12. The method of claim 1, further comprising:
determining a non-edge point between a first edge point and a second edge point; and
connect the first edge point to the second edge point using a line based on determining the non-edge point between the first edge point and the second edge point.

13. The method of claim 1, further comprising:
determining a non-edge point between a first edge point and a second edge point; and
generating a new line segment based on determining the non-edge point between the first edge point and the second edge point.

14. The method of claim 1, further comprising:
obtaining the raster image; and
generating the edge map by detecting the one or more edges in the raster image.

15. A system for generating a vector drawing from a raster image, comprising:
one or more processors; and
memory accessible to the one or more processors, the memory storing instructions, which upon execution by the one or more processors, cause the one or more processors to:
obtain an edge map for a raster image, the raster image including a plurality of pixels, and the edge map indicating one or more edge points of one or more edges in the raster image;
determine a point of the edge map corresponding to an input position, the input position being based on a user interaction with a graphical user interface displaying the raster image;
determine an edge point of the edge map corresponding to the input position, the edge point being determined from a neighborhood of one or more points associated with the point of the edge map; and
generate, using a plurality of edge points of the edge map, a vector drawing segment for a vector drawing representing the raster image, the plurality of edge points including the determined edge point and being based on the user interaction with the graphical user interface.

16. The system of claim 15, wherein the edge point is a closest edge point to the determined point of the edge map that is part of a same edge as a previous edge point, the previous edge point being determined prior to the edge point based on a previous point of the edge map determined for a previous input position.

17. The system of claim 15, wherein the processor is configured to:
determine the neighborhood of the one or more points associated with the point of the edge map based on a previous point of the edge map determined for a previous input position, the previous point being determined prior to the point of the edge map.

18. A non-transitory computer-readable medium having stored thereon instructions that, when executed by one or more processors, cause the one or more processors to:
obtain an edge map for a raster image, the raster image including a plurality of pixels, and the edge map indicating one or more edge points of one or more edges in the raster image;
determine a point of the edge map corresponding to an input position, the input position being based on a user interaction with a graphical user interface displaying the raster image;
determine an edge point of the edge map corresponding to the input position, the edge point being determined from a neighborhood of one or more points associated with the point of the edge map; and
generate, using a plurality of edge points of the edge map, a vector drawing segment for a vector drawing representing the raster image, the plurality of edge points including the determined edge point and being based on the user interaction with the graphical user interface.

19. The non-transitory computer-readable medium of claim 18, wherein the edge point is a closest edge point to the determined point of the edge map that is part of a same edge as a previous edge point, the previous edge point being determined prior to the edge point based on a previous point of the edge map determined for a previous input position.

20. The non-transitory computer-readable medium of claim 18, further comprising instructions that, when executed by the one or more processors, cause the one or more processors to:
determine the neighborhood of the one or more points associated with the point of the edge map based on a previous point of the edge map determined for a previous input position, the previous point being determined prior to the point of the edge map.

* * * * *